(12) United States Patent
Smits et al.

(10) Patent No.: US 11,974,055 B1
(45) Date of Patent: Apr. 30, 2024

(54) PERCEIVING SCENE FEATURES USING EVENT SENSORS AND IMAGE SENSORS

(71) Applicant: Summer Robotics, Inc., Campbell, CA (US)

(72) Inventors: Gerard Dirk Smits, Los Gatos, CA (US); Steven Dean Gottke, Concord, CA (US)

(73) Assignee: Summer Robotics, Inc., Campbell, CA (US)

( * ) Notice: Subject to any disclaimer, the term of this patent is extended or adjusted under 35 U.S.C. 154(b) by 0 days.

(21) Appl. No.: 18/488,123

(22) Filed: Oct. 17, 2023

Related U.S. Application Data

(60) Provisional application No. 63/379,772, filed on Oct. 17, 2022.

(51) Int. Cl.
*H04N 25/47* (2023.01)
*G06T 7/246* (2017.01)

(52) U.S. Cl.
CPC .............. *H04N 25/47* (2023.01); *G06T 7/246* (2017.01)

(58) Field of Classification Search
CPC ...... H04N 23/60; H04N 23/90; H04N 13/282; H04N 25/47; G06T 7/246
See application file for complete search history.

(56) References Cited

U.S. PATENT DOCUMENTS

| | | |
|---|---|---|
| 9,117,267 B2 | 8/2015 | Francis, Jr. et al. |
| 9,489,735 B1 | 11/2016 | Reitmayr |
| 11,704,835 B2 | 7/2023 | Cullen et al. |
| 11,785,200 B1 | 10/2023 | Smits et al. |

(Continued)

FOREIGN PATENT DOCUMENTS

| | | |
|---|---|---|
| CN | 109458928 A | 3/2019 |
| CN | 112365585 A | 2/2021 |

(Continued)

OTHER PUBLICATIONS

International Search Report and Written Opinion for International Patent Application No. PCT/US2021/063399 dated Mar. 22, 2022, 6 Pages.

(Continued)

*Primary Examiner* — Jayanti K Patel
*Assistant Examiner* — Christopher Kingsbury Glover
(74) *Attorney, Agent, or Firm* — John W. Branch; Branch Partners PLLC

(57) ABSTRACT

Embodiments are directed to perceiving scene features using event sensors and image sensors. Paths may be scanned across objects in a scene with one or more beams. Images of the scene may be captured with frame cameras. Events may be generated based on detection of beam reflections that correspond to the objects. Trajectories may be based on the paths and the events. A distribution of intensity associated with the trajectories may be determined based on the energy associated with the traces in the images. Centroids for the trajectories may be determined based on the distribution of the intensity of energy, a resolution of the frame cameras, or timestamps associated with the events. Enhanced trajectories may be generated based on the centroids such that the enhanced trajectories may be provided to a modeling engine that executes actions based on the enhanced trajectories and the objects.

28 Claims, 16 Drawing Sheets

(56) References Cited

U.S. PATENT DOCUMENTS

| | | |
|---|---|---|
| 2008/0012850 A1 | 1/2008 | Keating, III |
| 2008/0165360 A1 | 7/2008 | Johnston |
| 2008/0201101 A1 | 8/2008 | Hebert et al. |
| 2009/0096994 A1 | 4/2009 | Smits |
| 2014/0368614 A1 | 12/2014 | Imai et al. |
| 2015/0378023 A1 | 12/2015 | Royo Royo et al. |
| 2016/0180574 A1 | 6/2016 | Kaminitz et al. |
| 2016/0259168 A1 | 9/2016 | Katz et al. |
| 2017/0035281 A1 | 2/2017 | Takeuchi et al. |
| 2017/0176575 A1 | 6/2017 | Smits |
| 2017/0195589 A1 | 7/2017 | Kovacovsky et al. |
| 2019/0128665 A1 | 5/2019 | Harendt |
| 2019/0213309 A1 | 7/2019 | Morestin et al. |
| 2019/0279379 A1 | 9/2019 | Srinivasan et al. |
| 2020/0075658 A1 | 3/2020 | Kato et al. |
| 2020/0160012 A1 | 5/2020 | Nunnink et al. |
| 2020/0280664 A1 | 9/2020 | Lee et al. |
| 2021/0023714 A1 | 1/2021 | Zhang et al. |
| 2021/0141094 A1 | 5/2021 | Russ et al. |
| 2021/0304574 A1* | 9/2021 | Ramanathan .......... H04N 23/65 |
| 2022/0156998 A1 | 5/2022 | Lee et al. |
| 2022/0187461 A1 | 6/2022 | Cullen |
| 2022/0287676 A1 | 9/2022 | Steines et al. |
| 2023/0003549 A1 | 1/2023 | Paden |
| 2023/0015889 A1 | 1/2023 | Cullen et al. |
| 2023/0034733 A1 | 2/2023 | Cullen et al. |
| 2023/0060421 A1 | 3/2023 | Cullen et al. |
| 2023/0169683 A1* | 6/2023 | Paden ....................... G06T 7/55 348/139 |
| 2023/0230212 A1* | 7/2023 | García Capel ............ G06T 5/50 382/100 |
| 2023/0274523 A1 | 8/2023 | Paden et al. |
| 2023/0316657 A1 | 10/2023 | Smits et al. |

FOREIGN PATENT DOCUMENTS

| | | |
|---|---|---|
| CN | 112750168 A | 5/2021 |
| CN | 113313710 A | 8/2021 |
| CN | 116829902 A | 9/2023 |
| EP | 4260006 A1 | 6/2022 |
| JP | H0694428 A | 4/1994 |
| JP | 2009-243986 A | 10/2009 |
| JP | 2018-195240 A | 12/2018 |
| JP | 2020-052719 A | 4/2020 |
| JP | 2020-064011 A | 4/2020 |
| JP | 2020-106475 A | 7/2020 |
| JP | 2021-167776 A | 10/2021 |
| WO | 2018/000037 A1 | 1/2018 |
| WO | 2018/125850 A1 | 7/2018 |
| WO | 2019/189381 A1 | 10/2019 |
| WO | 2020/080237 A1 | 4/2020 |
| WO | 2021/039022 A1 | 3/2021 |
| WO | 2021/140886 A1 | 7/2021 |
| WO | 2022/132828 A1 | 6/2022 |
| WO | 2023/278868 A1 | 1/2023 |
| WO | 2023/288067 A1 | 1/2023 |
| WO | 2023/009755 A1 | 2/2023 |
| WO | 2023/028226 A1 | 3/2023 |
| WO | 2023/096873 A1 | 6/2023 |
| WO | 2023/164064 | 8/2023 |
| WO | 2023/177692 A1 | 9/2023 |
| WO | 2023/196225 A1 | 10/2023 |

OTHER PUBLICATIONS

International Search Report and Written Opinion for International Patent Application No. PCT/US2022/036006 dated Oct. 4, 2022, 7 Pages.

International Search Report and Written Opinion for International Patent Application No. PCT/US2022/037299 dated Oct. 25, 2022, 6 Pages.

International Search Report and Written Opinion for International Patent Application No. PCT/US2022/038724 dated Nov. 1, 2022, 6 Pages.

International Search Report and Written Opinion for International Patent Application No. PCT/US2022/041520 dated Nov. 8, 2022, 6 Pages.

Office Communication for U.S. Appl. No. 17/876,333 dated Feb. 21, 2023, 22 Pages.

Office Communication for U.S. Appl. No. 17/876,333 dated Mar. 1, 2023, 2 Pages.

International Search Report and Written Opinion for International Patent Application No. PCT/US2022/050626 dated Mar. 7, 2023, 8 Pages.

Office Communication for U.S. Appl. No. 17/895,489 dated Apr. 11, 2023, 36 Pages.

International Search Report and Written Opinion for International Patent Application No. PCT/US2023/013718 dated May 30, 2023, 7 Pages.

Office Communication for U.S. Appl. No. 18/130,080 dated Jun. 20, 2023, 36 Pages.

Office Communication for U.S. Appl. No. 17/895,489 dated Jul. 5, 2023, 13 Pages.

International Search Report and Written Opinion for International Patent Application No. PCT/US2023/015227 dated Jun. 27, 2023, 7 Pages.

International Preliminary Report on Patentability for International Patent Application No. PCT/US2021/063399 dated Jun. 29, 2023, 5 Pages.

International Search Report and Written Opinion for International Patent Application No. PCT/US2023/017271 dated Jul. 11, 2023, 7 Pages.

Office Communication for U.S. Appl. No. 18/121,486 dated Aug. 16, 2023, 2 Pages.

Office Communication for U.S. Appl. No. 18/121,486 dated Aug. 3, 2023, 11 Pages.

Office Communication for U.S. Appl. No. 18/222,780 dated Sep. 15, 2023, 10 Pages.

Office Communication for U.S. Appl. No. 18/130,080 dated Sep. 28, 2023, 43 Pages.

Office Communication for U.S. Appl. No. 18/225,833 dated Sep. 15, 2023, 19 Pages.

* cited by examiner

PERCEIVING SCENE FEATURES USING EVENT SENSORS AND IMAGE SENSORS

CROSS-REFERENCE TO RELATED APPLICATION

This application is a Utility patent application based on previously filed U.S. Provisional patent application U.S. Ser. No. 63/379,772 filed on Oct. 17, 2022, the benefit of the filing date of which is hereby claimed under 35 U.S.C. § 119(e), and the contents of which is further incorporated in entirety by reference.

TECHNICAL FIELD

The present innovations relate generally to machine sensing or machine vision systems, and more particularly, but not exclusively, to perceiving scene features using event sensors and image sensors.

BACKGROUND

The state of the art in machine vision or robotic vision is largely based on cameras where the input to the sensing system is two-dimensional (2D) arrays of pixels that encode the amount of light that each pixel received over an exposure period, or on depth capture technologies (e.g., Time-of-Flight (ToF) cameras, structured light cameras, LIDAR, RADAR, or stereo cameras, to name a few) which provide three-dimensional (3D) point clouds, where each point in the point cloud may store its position in space with respect to the vision system, and may store any of a number of other data associated with the patch of reflecting material that the point was generated from (e.g., brightness, color, relative radial velocity, spectral composition, to name a few). Note that 3D point clouds may be represented in "frames", similar in spirit to the frames of images from cameras, meaning that they don't have a fundamental representation of continuously evolving time. To provide useful perception output that may be used by machine vision applications, such as, robotic planning and control systems, these 2D or 3D data often need to be processed by machine vision algorithms implemented in software or hardware. In some cases, some machine vision systems may employ machine learning to determine properties or features of the world that may be salient to particular robotic tasks, such as, the location, shape orientation, material properties, object classification, object motion, relative motion of the robotic system, or the like. In many cases, neither the 2D nor 3D representations employed by conventional machine vision systems provide inherent/native support for continuous surface representation of objects in the environment.

Furthermore, 3D capture of objects by image cameras, for instance using standard CMOS image sensors, may be imprecise without additional structure information placed on the objects. In some cases, this may become increasingly difficult if the objects being scanned may be in motion. In some cases, event sensors (e.g., event cameras) may be employed in sensing/capture applications. Event sensors may be well adapted to capture moving objects and may react faster than most frame capture cameras. However, event sensors may inherently capture less data about the scenes they survey, as they typically continuously show changes that happen at each pixel, but capture little if information there are no substantial changes in the area captured by each pixel. Also, event sensors often provide less pixel density than a same-sized image sensor (e.g., frame capture cameras); for instance, a high-end event sensor may have 1 megapixels total, whereas a high-end image sensor may have 100 megapixels total over the sensor array. Combining data from various types of sensors may be advantageous but difficult. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
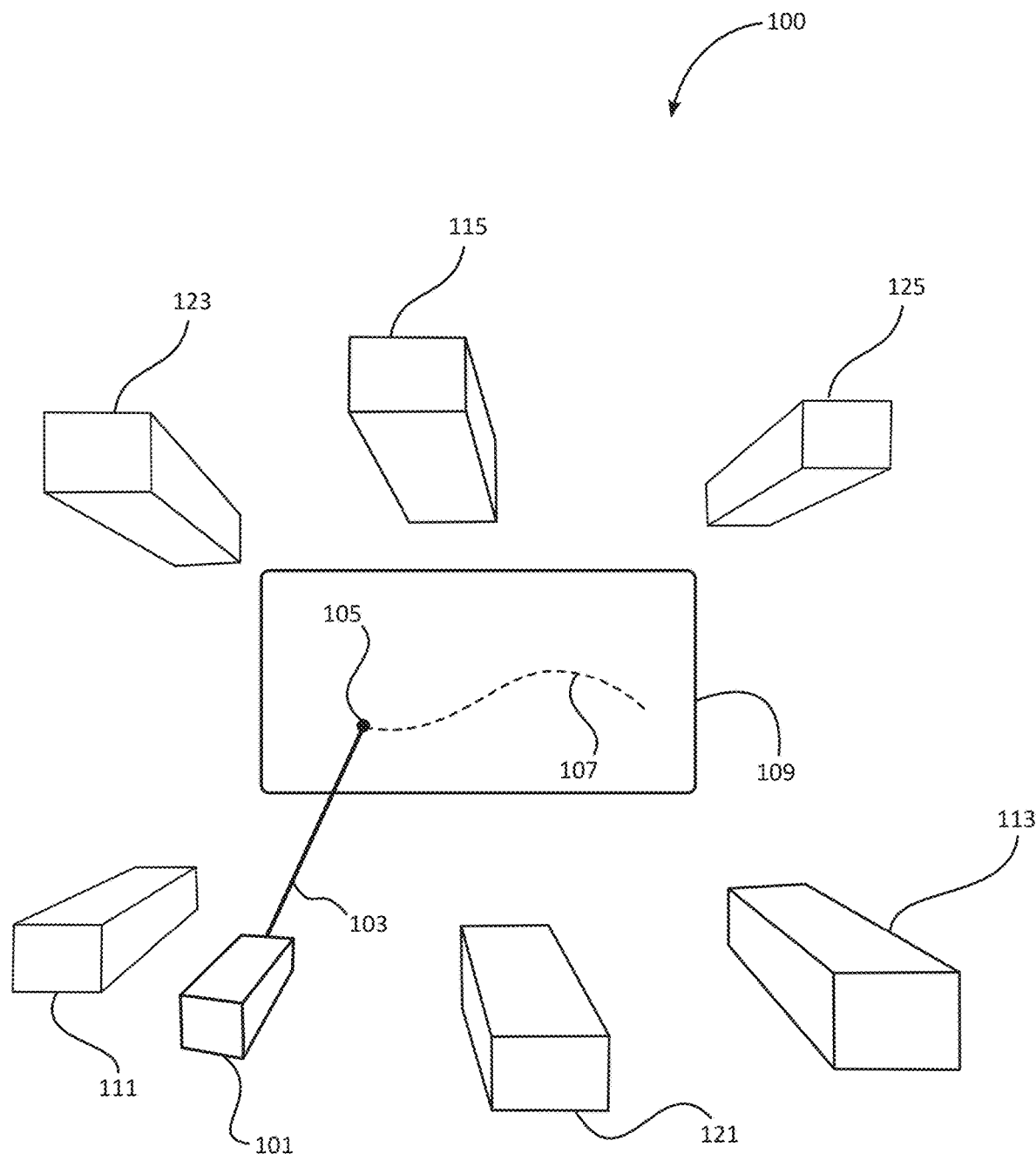
FIG. 1 shows a logical schematic of a multi-camera sensing system in accordance with one or more of the various embodiments.

Various embodiments now will be described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the present innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PUP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "scanning signal generator," "signal generator," or "beam scanner" refer to a system or a device that may produce a beam that may be scanned/directed to project into an environment. For example, scanning signal generators may be fast laser-based scanning devices based on dual axis microelectromechanical systems (MEMS) that are arranged to scan a laser in a defined area of interest. The characteristics of scanning signal generator may vary depending on the application or service environment. Scanning signal generators are not strictly limited to lasers or laser MEMS, other types of beam signal generators may be employed depending on the circumstances. Critical selection criteria for scanning signal generator characteristics may include beam width, beam dispersion, beam energy, wavelength(s), phase, or the like. Scanning signal generator may be selected such that they enable sufficiently precise energy reflections from scanned surfaces or scanned objects in the scanning environment of interest. The scanning signal generators may be designed to scan various frequencies, including up to 10s of kHz. The scanning signal generators may be controlled in a closed loop fashion with one or more processors that may provide feedback about objects in the environment and instructs the scanning signal generator to modify its amplitudes, frequencies, phase, or the like.

As used herein, the terms "event sensor," "event camera sensor," or" "event camera" refer to a device or system that detects reflected energy from scanning signal generators. Event sensors may be considered to comprise an array of detector cells that are responsive to energy reflected from scanning signal generators. Event sensors may provide outputs that indicate which detector cells are triggered and the time they are triggered. Event sensors may be considered to generate sensor outputs (events) that report the triggered cell location and time of detection for individual cells rather than being limited to reporting the state or status of every cell. For example, event sensors may include event sensor cameras, SPAD arrays, SiPM arrays, or the like.

As used herein the terms "image sensor," or "frame camera" refer to a device or system that can provide electronic scene information (electronic imaging) based on light or other energy collected at surface the image sensor. Conventionally, image sensors may be comprised of charge-coupled devices (CCDs) or complementary metal oxide semi-conductors (CMOS) devices. In some cases, image sensors may be referred to as frame capture cameras. Also, in some cases, image sensors may be deployed or otherwise used to collect event information.

As used herein the terms "trajectory," "parametric trajectory," "surface trajectory" refers to one or more data structures that store or represent parametric representations of curve segments that may correspond to surfaces sensed by one or more sensors. Trajectories may include one or more attributes/elements that correspond to constants or coefficients of segments of one-dimensional analytical curves in three-dimensional space. Trajectories for a surface may be determined based on fitting or associating one or more sensor events to known analytical curves. Sensor events that are inconsistent with the analytical curves may be considered noise or otherwise excluded from trajectories.

As used herein the term "configuration information" refers to information that may include rule-based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the innovations in order to provide a basic understanding of some aspects of the innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to perceiving scene features using event sensors and image sensors. In one or more of the various embodiments, a plurality of paths may be scanned across one or more objects in a scene with one or more beams.

In one or more of the various embodiments, one or more images of the scene may be captured with one or more frame cameras such that the one or more images include one or more traces that correspond to the plurality of paths and the one or more objects.

In one or more of the various embodiments, a plurality of events may be generated based on detection, by one or more event cameras, of one or more beam reflections that correspond to the one or more objects.

In one or more of the various embodiments, a plurality of trajectories may be based on the plurality of paths and the plurality of events such that each trajectory is a parametric representation of a one-dimensional curve segment in a three-dimensional space.

In one or more of the various embodiments, a distribution of signal intensity associated with one or more of the plurality of trajectories may be determined based on an intensity of energy associated with the one or more traces in the one or more images.

In one or more of the various embodiments, one or more centroids for the one or more trajectories may be determined based on the distribution of the intensity of energy, a resolution of the one or more frame cameras, or one or more timestamps associated with the one or more events.

In one or more of the various embodiments, one or more enhanced trajectories may be generated based on the one or more centroids such that the one or more enhanced trajectories may be provided to a modeling engine that executes one or more actions based on the one or more enhanced trajectories and the one or more objects.

In one or more of the various embodiments, determining the one or more centroids may include: determining a sequence of one or more spots in the one or more images that comprise the one or more traces such that a diameter of the one or more spots may be a width of the one or more associated traces on the one or more frame cameras and such that the diameter of the one or more spots exceeds a pixel size of the one or more frame cameras; determining one or more pixels associated with the one or more spots based on one or more intensity values associated with the one or more traces such that the one or more pixels are associated with an intensity value that exceeds a noise value of background energy; determining the one or more centroids based on a gradient of the intensity value of the one or more pixels; or the like.

In one or more of the various embodiments, a sequence of one or more spots may be determined in the one or more images that correspond to the one or more traces. In some embodiments, one or more pixels of the one or more frame cameras may be determined based on the one or more spots.

In some embodiments, a portion of the one or more timestamps associated with the one or more spots may be determined based on the one or more events. In some embodiments, a position of each of the one or more spots may be determined based on the one or more pixels and the portion of the one or more timestamps.

In one or more of the various embodiments, a time window of capture for an image may be determined based on a start time and an end time of capture for the image. In some embodiments, the time window for the image may be compared with the one or more timestamps that correspond to the plurality of events. In some embodiments, a portion of the plurality of events may be associated with the image based on the comparison such that each associated event has a timestamp that is within the time window associated with the image.

In one or more of the various embodiments, one or more of a frequency or an intensity of the one or more beams may be modulated. In some embodiments, one or more spots in the one or more images may be determined based on the one or more modulated beams such that a position of the one or more spots follows the one or more paths. In some embodiments, the one or more trajectories may be matched with the one or more beams based on the one or more spots and the plurality of events such that the plurality of events may correspond to the one or more spots.

In one or more of the various embodiments, one or more of a frequency or an intensity of the one or more beams may be modulated such that the modulation may be periodically changed during the scanning of the plurality of paths. In some embodiments, one or more spots in the one or more images may be determined based on the one or more modulated beams such that a portion of the one or more spots may be one or more of larger than one or more other portions of the spots or spaced apart different distances along the one or more paths. In some embodiments, one or more features of the one or more objects may be identified based on the portion of the one or more spots.

In one or more of the various embodiments, a position in the scene associated with one or more events may be determined based on a position of one or more pixels in the event camera sensor and the one or more timestamps associated with the one or more events. In some embodiments, the position in the scene may be matched to a portion of the one or more traces based on the one or more trajectories. In some embodiments, a portion of the one or more frame cameras that have a field of view that includes the position in the scene may be determined.

DETAILED DESCRIPTION

FIG. 1 shows a logical schematic of multi-camera sensing system 100 in accordance with one or more of the various embodiments. In one or more of the various embodiments, system 100 may be considered a multi-camera sensing system that may be capable of super resolution scanning of a scene. In some embodiments, a signal generator (e.g., a laser) 101 may be configured to scan patterns across the scene, in this case across an object 109. In some embodiments, a signal generator may project a beam, such as, beam 103 to scan a spot 105 by tracing a path 107 across the object or objects in the scene. In some embodiments, image sensor 111, image sensor 113, and image sensor 115 may be considered frame capture cameras arranged to capture images of the scene.

In one or more of the various embodiments, event sensor 121, event sensor 123, and event sensor 125 may be event sensors arranged to capture one or more portions or all of the same scene as the image sensors. In some embodiments, event sensors may be arranged to trigger on light level differences at a pixel level. Accordingly, in some embodiments, each pixel may trigger up to the time resolution of a corresponding event sensor, which may be as fast as 1 microsecond. Also, in some cases, for some embodiments, faster times may be possible if the event sensor may be based on a SPAD (single photon avalanche photo-diode) image sensor array, or the like. In this example, sensing system 100 may include three image sensors and three event sensors, but other configurations or combinations of sensors may be possible. In some embodiments, there may be one or more event cameras included in system 100, as well as one or more image sensors. in some cases, for some embodiments, the various sensors in systems, such as, system 100 may be configured such that there may be substantial overlap in the fields of views of each of the sensors with all of the rest. Also, in some embodiments, one or more of the sensors may have overlap of fields of view with a subset of the other sensors in the system. In another embodiment, multiple beams from one or more signal generators may be scanned across the objects in the fields of view of the sensors simultaneously from one or more signal generators, such as, lasers.

Figure 2A:
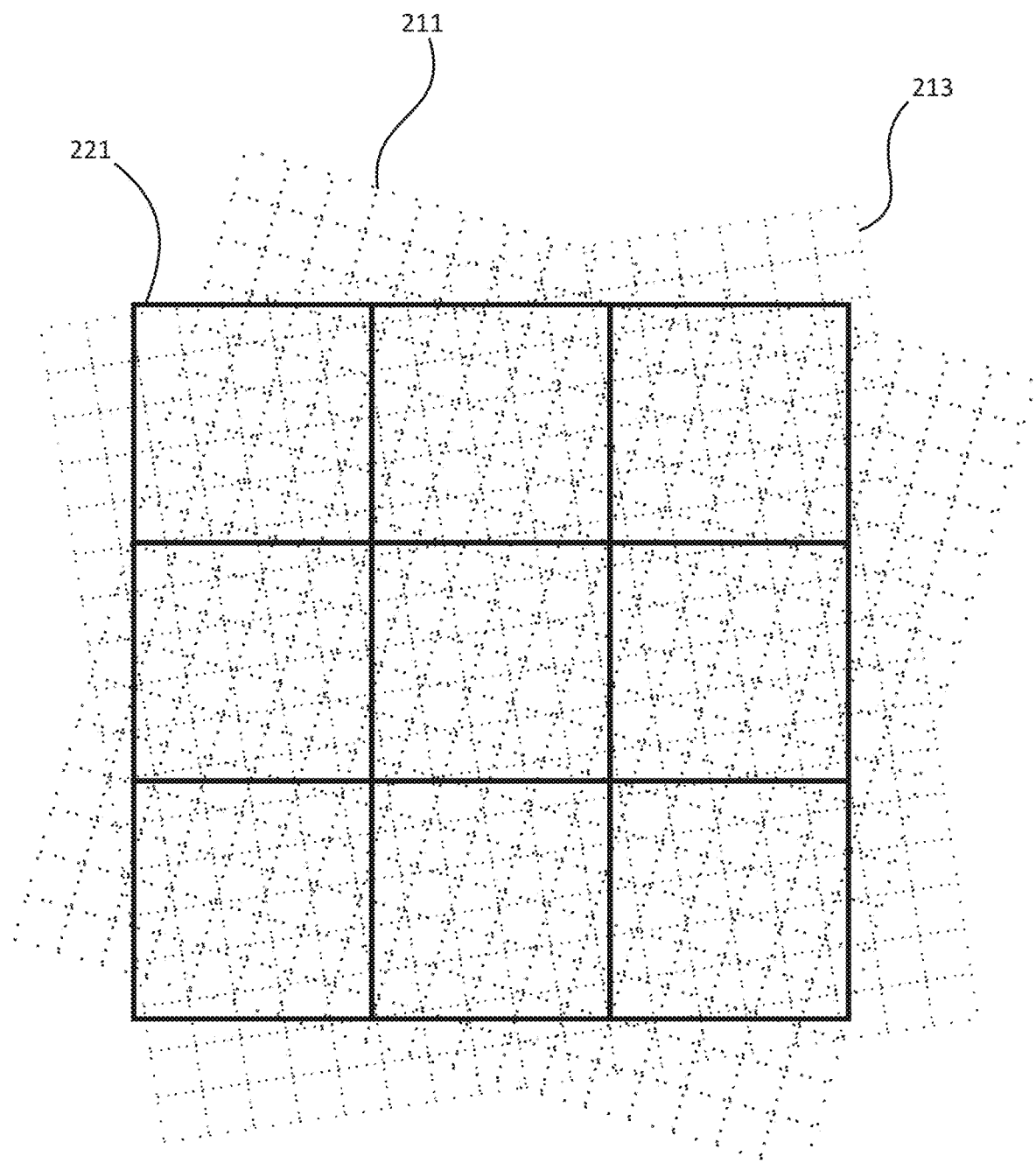
FIG. 2A illustrates a logical schematic of a close-up view of part of the field of view of some sensors of a sensing system in accordance with one or more of the various embodiments.

FIG. 2A illustrates a logical schematic of a close-up view of part of the field of view of some sensors of system 100 in accordance with one or more of the various embodiments. In some embodiments, sensor may be focused on object 109, for example. In particular, details from three of the sensors are depicted.

In this example, grid 211 may be a subset of the pixels of image sensor 111 as imaged from the surface of the object in the scene. Grid 221 may be a subset of the pixels of event sensor 121 as imaged from the surface of the object in the scene, overlaid on top of grid 211 showing that both subsets of pixels from each sensor are imaging a similar part of the object. Similarly, grid 213 may be a subset of image sensor 113 as imaged on the same surface. As described above, in some embodiments, image sensor 111 and image sensor 113 may be considered to be frame capture cameras with a higher pixel density than event sensor 121, and this may be indicated by the disparities in size between grids 211/213 and 221. One of ordinary skill in the art will appreciate that the positioning and rotation of the grids may be relatively arbitrary depending on configuration of the sensing system or the scanning environment/application; accordingly, there may be no need to precisely align either rotation angles nor to translate them to a common origin. In some cases, for some embodiments, alignment between various sensors may be imprecise or skewed, since each sensor, whether event sensor or image sensor, may be measuring the object from a different angle, distance, and perspective. For illustration, the various grids are displayed uniformly, but in practice they may be distorted somewhat from both the shift in perspective of each sensor, but also because most objects that are scanned have 3D features that introduce their own changes in the receptive field of the imaged pixels.

Figure 2B:
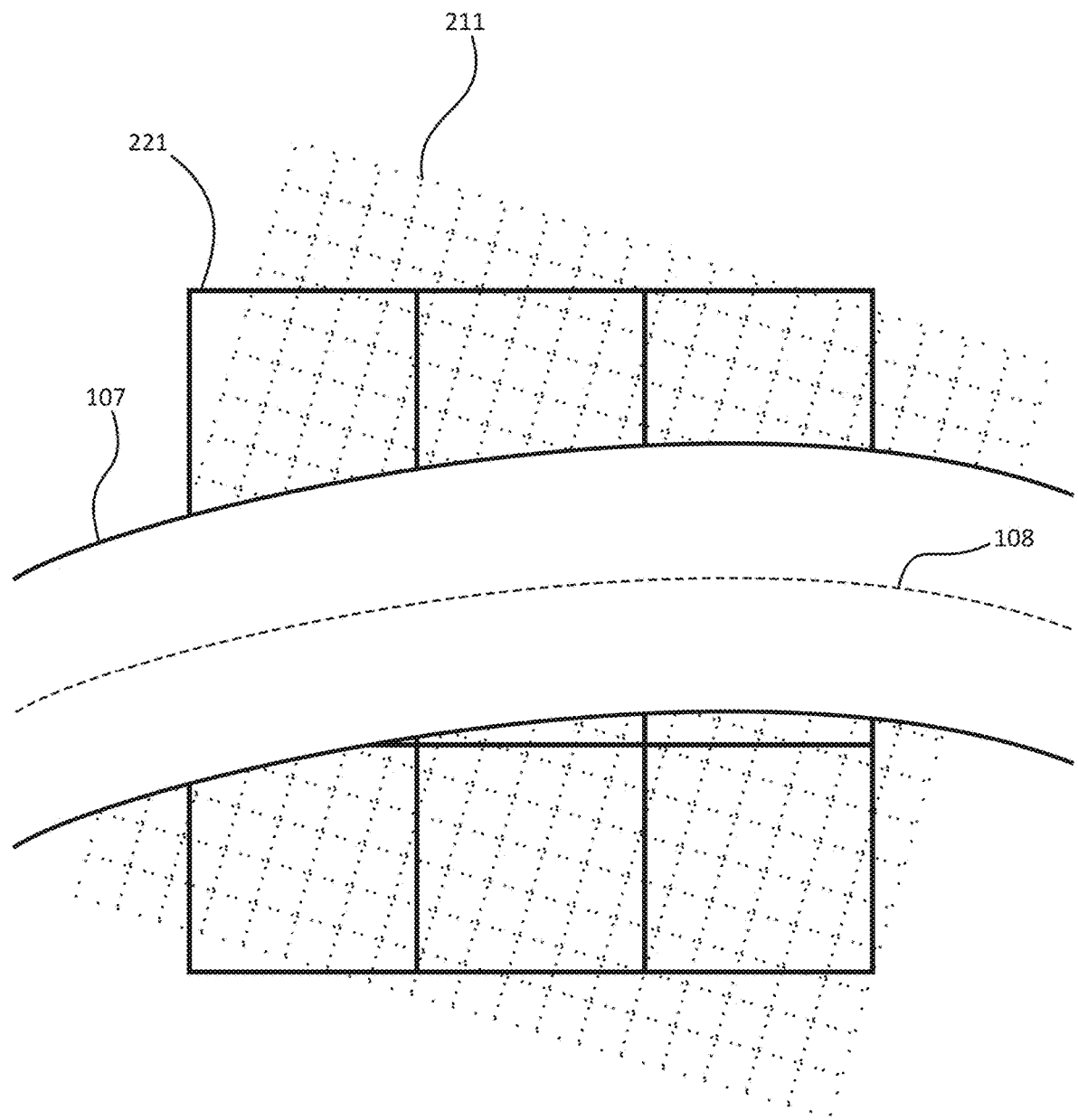
FIG. 2B shows a close-up view of the field of view of sensors in a sensing system in accordance with one or more of the various embodiments.

FIG. 2B illustrates a logical schematic of a close-up view of part of the field of view of some sensors of system 100 in accordance with one or more of the various embodiments. In some embodiments, sensor may be focused on object 109, for example. In particular, details from three of the sensors are depicted.

FIG. 2B shows the same close-up view of the field of view as in FIG. 2A, but overlaying the path 107 of the laser spot 105 as it traces across the object 109 in accordance with one or more of the various embodiments; only grids 211 and 221 are shown, though in practice, some or all, event sensors or some or all, image sensors may be viewing the scanning-environment/scene simultaneously. In this example, the laser spot size may be focused such that the effective width of the beam may be similar to the width of a single pixel as imaged on the event sensor 121, but in other variants, the size of the beam may be smaller or larger than the event sensor pixel as imaged. Though it may be possible that the beam intensity profile could be fairly flat across the width of the beam spot, it may be more likely that the beam intensity profile may be similar to that of a Gaussian shape, where the brightest portion may be in the center of the beam. This brightest portion would then trace out the center of the beam path shown by line 108.

Figure 2C:
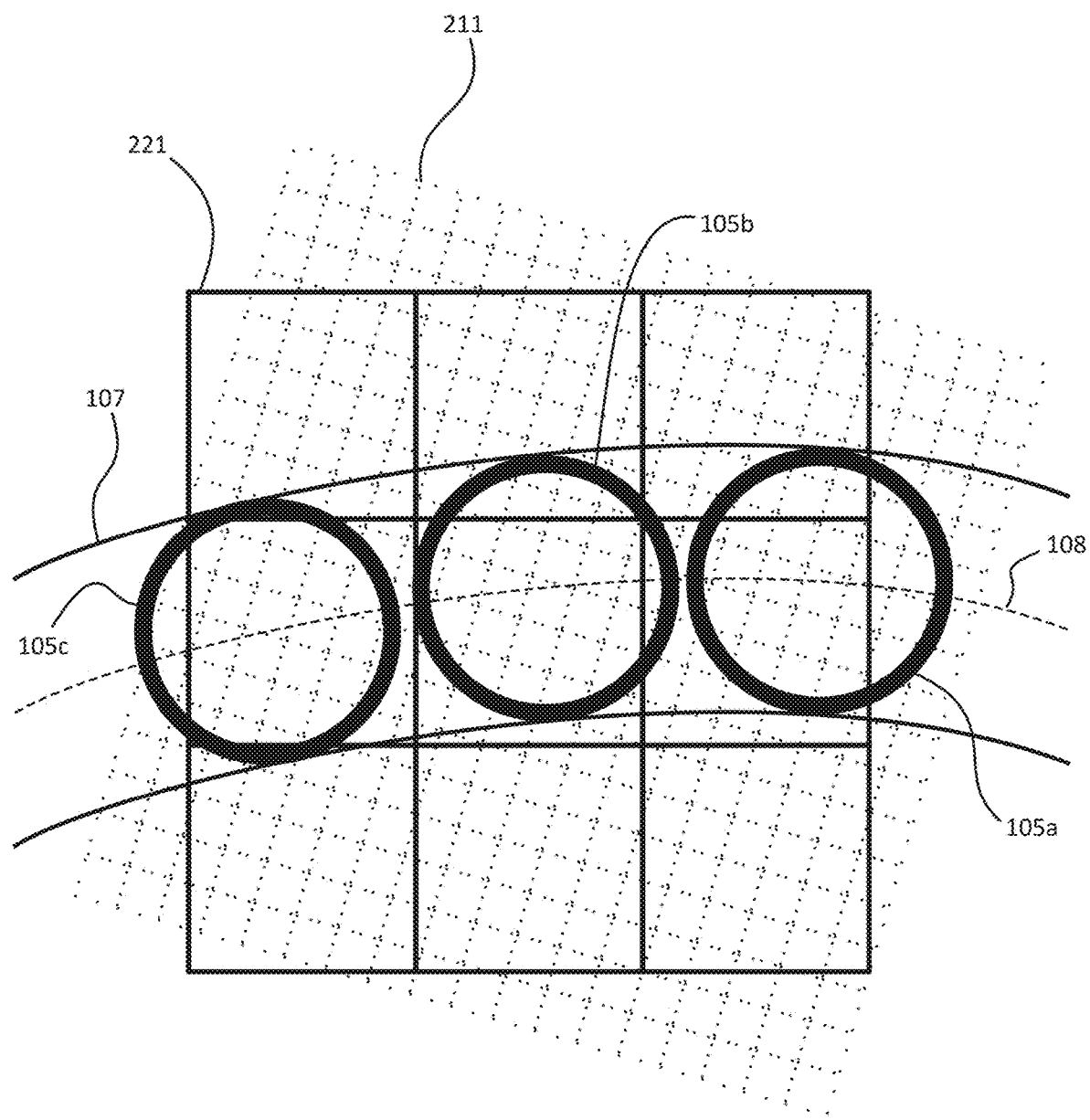
FIG. 2C shows positions of a laser beam spot as it traces the path along an object in accordance with one or more of the various embodiments.

FIG. 2C shows positions of the laser spot 105 as it traces the path along the object by circles 105a, 105b, and 105c in accordance with one or more of the various embodiments. These circles are not representative of individual spots, but instead diagrams showing where the laser spot lies on the object at different times as the beam moves along the path 107. In some embodiments, signal generators, such as, lasers may be operated in a CW (continuous wave) mode. Also, in some embodiments, the signal generator may be modulated or pulsed in some to conform to a defined pattern so that the beam turns on and off quickly; in an example, spots 105a-c might be representative of this.

In one or more of the various embodiments, each type of sensor may be arranged to capture different kinds of data about the laser beam over the trace of its entire path. In some embodiments, event sensor 121 may have a relatively coarse resolution compared to the image sensor. In addition, in some cases, event sensors may trigger in a binary fashion. Accordingly, in some embodiments, if there may be enough light change to trigger a particular event pixel, it may send out an event at that position with a substantially exact timestamp down to the time resolution of the sensor, but if not enough light reaches a pixel, there will be no signal event outside of other noise events. Thus, in some cases, an event sensor may not provide reliable grayscale output. In contrast, in some cases, image sensors, such as, image sensor 211 may provide finer resolution as compared to event sensors. In some embodiments, pixels of the image sensor may also be read out in grayscale based on the light/energy received during its collection time per frame. Accordingly, in some embodiments, using both the shape of the beam profile, as well as the grayscale intensities over the beam path trajectories, an accurate centroid of the path 108 may be calculated. However, in some cases, image sensors may have slower capture rates than event sensors. Also, in some cases, image sensors, which may be equipped with a global shutter so that all pixels may be read from the same light exposure, may provide limited or crude time information, with an effective timestamp on all of its pixels somewhere during the exposure. For example, an image sensor with a frame rate of 200 Hz would still have at best a time precision of 5 milliseconds.

Figure 3A:
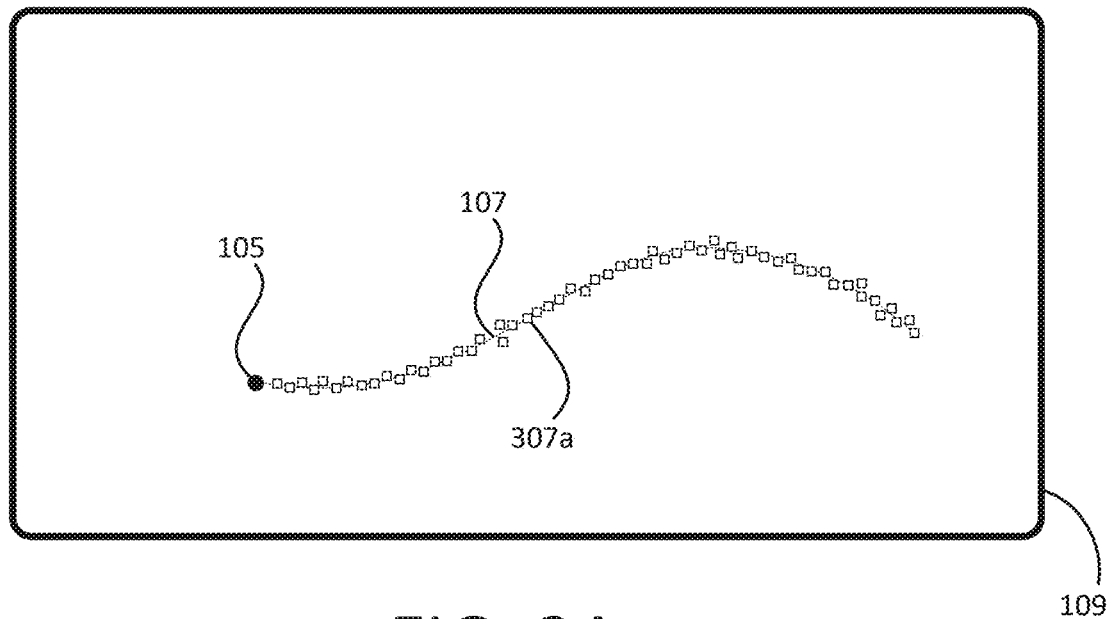
FIG. 3A shows a close-up view of an object as signal generator beam may be traced along a path in accordance with one or more of the various embodiments.
Figure 3B:
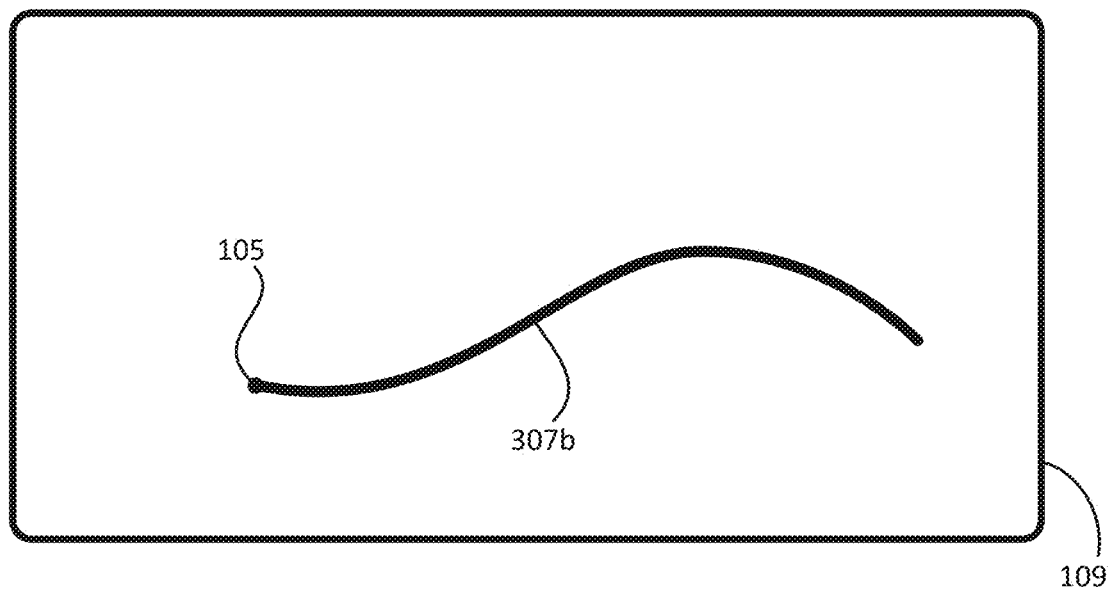
FIG. 3B shows a close-up view of an object imaged by an image sensor in accordance with one or more of the various embodiments.

FIGS. 3A and 3B illustrates paths that may be generated by a sensing system in accordance with one or more of the various embodiments. In this example, for some embodiments, FIG. 3A shows a close-up view of object 109 as the beam may be traced along path 107 in accordance with one or more of the various embodiments. Event points 307a may be representative of data captured by event sensor 121 and are captured along the entirety of path 107. FIG. 3B shows the same close-up view of object 109 but as imaged by image sensor 111 into a wider path 307b. Points 307a are generally captured with lower resolution than the pixels of path 307b. However, each event point may be in the form of (x, y, t), which has an (x, y) position in the event sensor and also a timestamp t, so that the timing of each point may be precise. A curve (e.g., trajectory), for example a spline, may be fit along event points 307a to provide a parametric functional form of the events. In some embodiments, this curve (or trajectory) may be calculated at various positions along the path to determine a more precise (x, y, t) at any point along the curve. In some cases, a calculated point, (xc, yc, tc) may have subpixel accuracy more precise than the spatial resolution of the sensor array on the event sensor. Time resolution may be similarly improved, where the accuracy of tc may be faster than the time resolution of the event sensor. Even with subpixel accuracy of (xc, yc) of calculated points from the path as captured by the event sensor, still the imaged pixels may be many times larger than those imaged by the image sensor, which may have 3-10 times as many pixels across the beam profile associated with path 307b. For example, by calculating the centroid of beam 108, the path position laterally will be quite precise. However, the path centroid 108 will have no time information. Accordingly, in some embodiments, the path as determined by the event sensor has much better information about the position of the beam at any given time, and thus has excellent positional sensitivity in the direction of the spot movement, whereas the path captured by the image sensor has excellent positional sensitivity perpendicular to the spot movement. Combination of these data may provide super resolution of positions and objects scanned by the beam or beams. This may allow capture of finer details than could be taken with either type of sensor alone. Note that these details captured are in the form of 3D paths (e.g., trajectories) and shapes; an image sensor, particularly one with very high resolution, may already be capturing standard image data that has information about some of these fine details, but that may be not the same as using scanned beams to precisely ascertain the 3D shape. Multiple views from two or more image sensors may be used to improve the resolution of triangulation of the fine details.

Figure 4A:
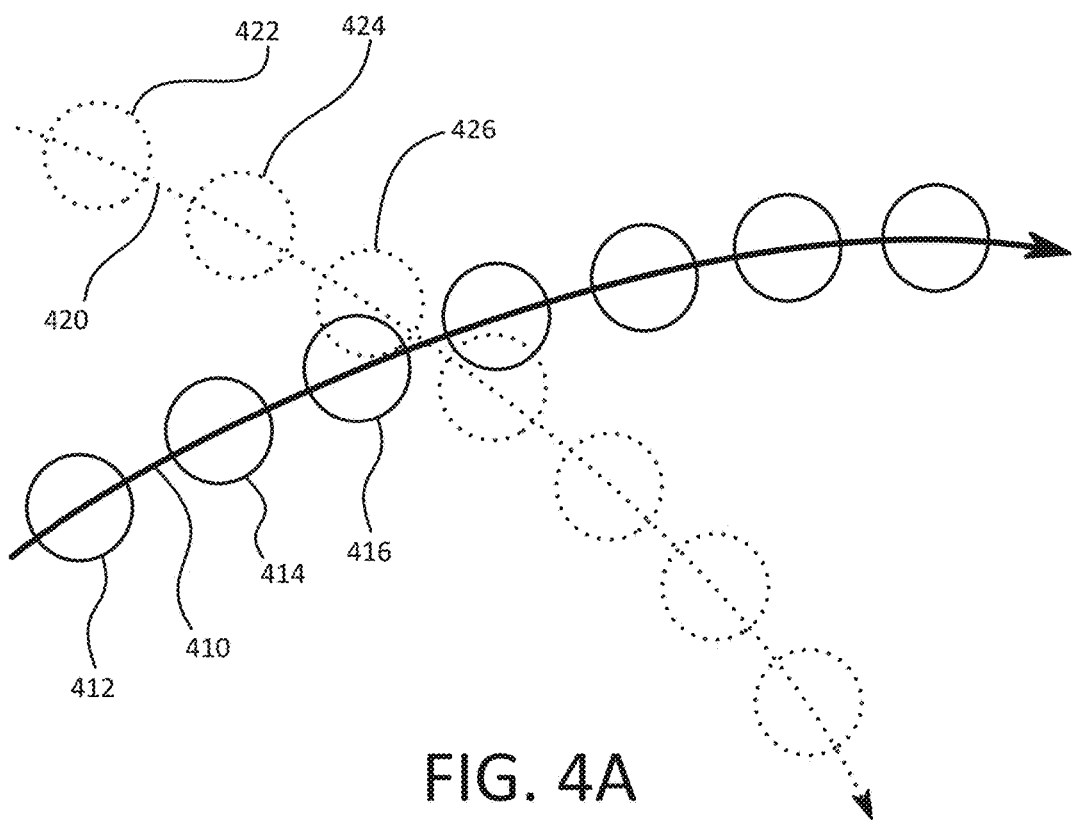
FIG. 4A shows a close-up view of spot patterns for perceiving scene features using event sensors and image sensors in accordance with one or more of the various embodiments.
Figure 4B:
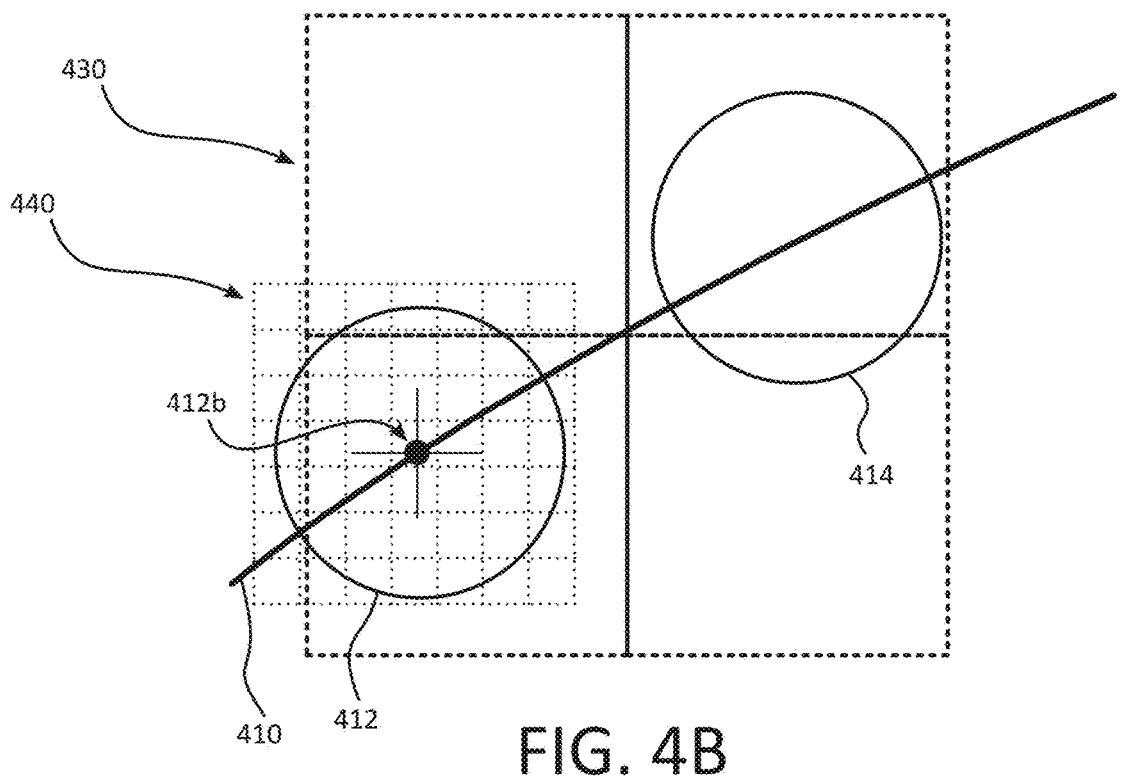
FIG. 4B shows a close-up view of spot patterns for perceiving scene features using event sensors and image sensors in accordance with one or more of the various embodiments.

In some embodiments (like that shown in FIG. 2C) if the laser (e.g., signal generator) may be modulated or pulsed to create instantaneous spots on objects in the scene, additional information may be generated by combining data from both event sensors and image sensor. In an example, if beams are turned on for 100 ns with a repeat rate of 1 MHz, then the result may look similar to a spot pattern as shown in FIG. 4A. In some embodiments, actual duty cycles of the beam may vary from these numbers so that the beam spots remain reasonably distinct; although a continuous beam may be mapped and fitted to precisely to timestamps, this may be less likely for image sensors that run at slower frame rates. Duty cycles of beam modulation may be chosen to match event camera resolution rates or could be selected independently. In some embodiments, the time on and off parameters may be selected such that individual spots of each trajectory may be individually captured on the image sensor. In some embodiments, the length of time where a laser may be turned on may result in a captured spot that may be substantially like the shape profile of the beam. In some embodiments, the beam may be left on longer; in this case, there may be some motion blurring such that the shape of the captured spot may be somewhat oval. In either case, the centroids of the beam spots may be determined and correlated to event sensor data. For example, trajectory 410 and trajectory 420 are depicted in the figure; a number of individual spots may be captured as well, some of them labeled as spot 412, spot 414, and spot 416. Similarly, trajectory 420 may have spots, such as, spot 422, spot 424, and spot 426 along with others. A close-up view of trajectory 410 is shown in FIG. 4B. In this example, grid 430 may be representative of the captured view of event sensor pixels on one of the event sensors watching the scene; one or more image sensors can also be measuring these spots as well. Image sensor array grid 440 which might be overlaid on the event sensor grid from its own perspective still has a much higher resolution than the event sensor array.

In some embodiments, spot 412 may trigger one or more pixels in each event sensor; event sensor parameters may be configured so that individual beam spots can trigger thresholds in the sensor so that spots are detectable. The timing of the spots triggering may be correlated down to the time resolution of each event sensor. Though the beam may be not scanning continuously in this mode, there may remain a strong correlation for the beam movement, and as such, a trajectory 410 may be able to be inferred from the various events corresponding to spots captured along the trajectory (e.g., trajectory 412, trajectory 414, trajectory 416). In some cases, timestamps of the events corresponding to spots may be further refined by matching to the smooth shape of the trajectory. At the same time, images captured on the image sensor may be associated with spots captured on the event sensor. In an example where the linear resolution of an image sensor is ten times higher than an event camera, then if one pixel triggers on an event camera, up to 100 pixels may show grayscale signal above the background noise. With a Gaussian or other repeatable beam profile, the centroid 412b of spot 412 may be calculated with high precision compared to the (X, Y) position on the event sensor. In our example, where the image sensor has a linear resolution ten times higher than the event camera, it may appear that the (X, Y) position may be increased by a factor of ten compared to that seen on the event camera. However, this understates the potential improvement; when fitting the centroid of a Gaussian beam on the image sensor, where grayscale images can be seen over the beam profile, the centroid may be determined at a subpixel level. This is a subpixel level of the image sensor array, so if the (X, Y) position could be calculated down to 0.1 pixels in each dimension, then in the event camera space this corresponds to estimating the position with an accuracy of 0.01 pixels. Higher accuracy on the image sensor may be possible as well, with further associated improvement at the event camera space. In this embodiment, the (X, Y) position of each spot may be inferred from the image sensor while the timestamp of the events corresponding to that spot can be used for the exact timing of that spot.

In some embodiments, time correlation of each captured spot could be calculated in a different manner, where the timestamps of the event camera data are used for spot sequencing rather than as exact timestamps. Using the previous example, where a laser is modulated so that it is turned on at a 1 MHz rate (that is, every 1 μs) for 100 ns at a time, spots may be captured at each event camera with associated timestamps. Because the timestamps of spots as captured across a trajectory are monotonically increasing, both the timestamps as well as the spatial positions on the event camera may be used to assign which spot belongs to which timestamp and assign an order to them over time. Because the modulation rate may be precisely controlled on the laser, regardless of the actual captured timestamp, the precise timing of each pulse of the laser may be determined as well. In our example, spots 412, 414, and 416 may be hit the target substantially 1 μs apart. The actual timestamp may vary by 1 or more μs based on various factors, such as where the spot hits on the event sensor array, timing of the pulse compared to the time base triggering of the event cameras, and other factors, but nevertheless the actual time may be assigned precisely. In turn, when the spots of the event cameras are associated with the precise linear positions of the spots on the multiple image sensors, they may be assigned both a highly precise position and time with this method.

Also, in some embodiments, spatial correlation between the types of sensors may be done in more than one way. In some embodiments, image sensors may be configured to be substantially co-located each with an event sensor. In this case, the positions of spots within each pair of event sensor/image sensor may be well-correlated, and the data from the pair may then be combined with other sets of spot positions if calculating positions of 3D objects. In some embodiments, because timestamps associated with individual spots may be synchronized among the various event sensors, multiple spots and beams scanned may be captured simultaneously. In some embodiments, the various event sensors and image sensors may be spatially distributed similar to that shown in FIG. 1. In this case, because each sensor position may be well-calibrated, spots from image sensors may be correlated by position with those from various event sensors. The spots alone may be correlated among sensors, but this may be aided by grouping spots derived from single trajectories such as trajectory 410 or trajectory 420. Spots creating trajectories may be more easily assigned using event sensor data, since each spot may be spatially and temporally correlated with adjacent spots from the same trajectory. Once this has been done, the set of spots may be matched with those from the image sensors using epipolar geometry, graph crossings, bundle adjustment, or other methods. These methods may be used to correlate an arbitrary number of event sensors and image sensors, which may be capable of reading spot locations from five, ten, or more concurrently scanning beams. One of the main limitations is the number of spots captured on the image sensors in any one frame captured. Results may be improved if there may be fewer intersections among trajectories in a single frame. For example, spot 416 and spot 426 from different trajectories may still be captured within the same sensor frame on a particular image sensor. If they remain distinct enough, centroids of multiple beam spots might still be able to be extracted, but if there may be too much overlap, the image sensor might become oversaturated, which may make this process more difficult. In this case, overlapping portions may be excluded from the analysis, which may still leave sufficient data to calculate 3D surface positions over time. Nevertheless, there may within the time window of a single frame of an image sensor be many spots on the sensor captured corresponding to a number of simultaneous or sequential trajectories. If event camera data were not used for the purpose of identifying and matching which spots on various cameras correspond to each other, then processing of image sensor data alone between the various image sensor views could be extremely computationally intensive. By using event camera data to sequence and identify laser spots captured, computation required may be reduced by many orders of magnitude. This is possible because each spot may have a high-resolution location from the image sensor data, a clearly identified trajectory it belongs to assigned by event camera data, as well as a unique timestamp that may be correlated between the cameras with a known ground truth time based on modulation of the laser or lasers.

Figure 4C:
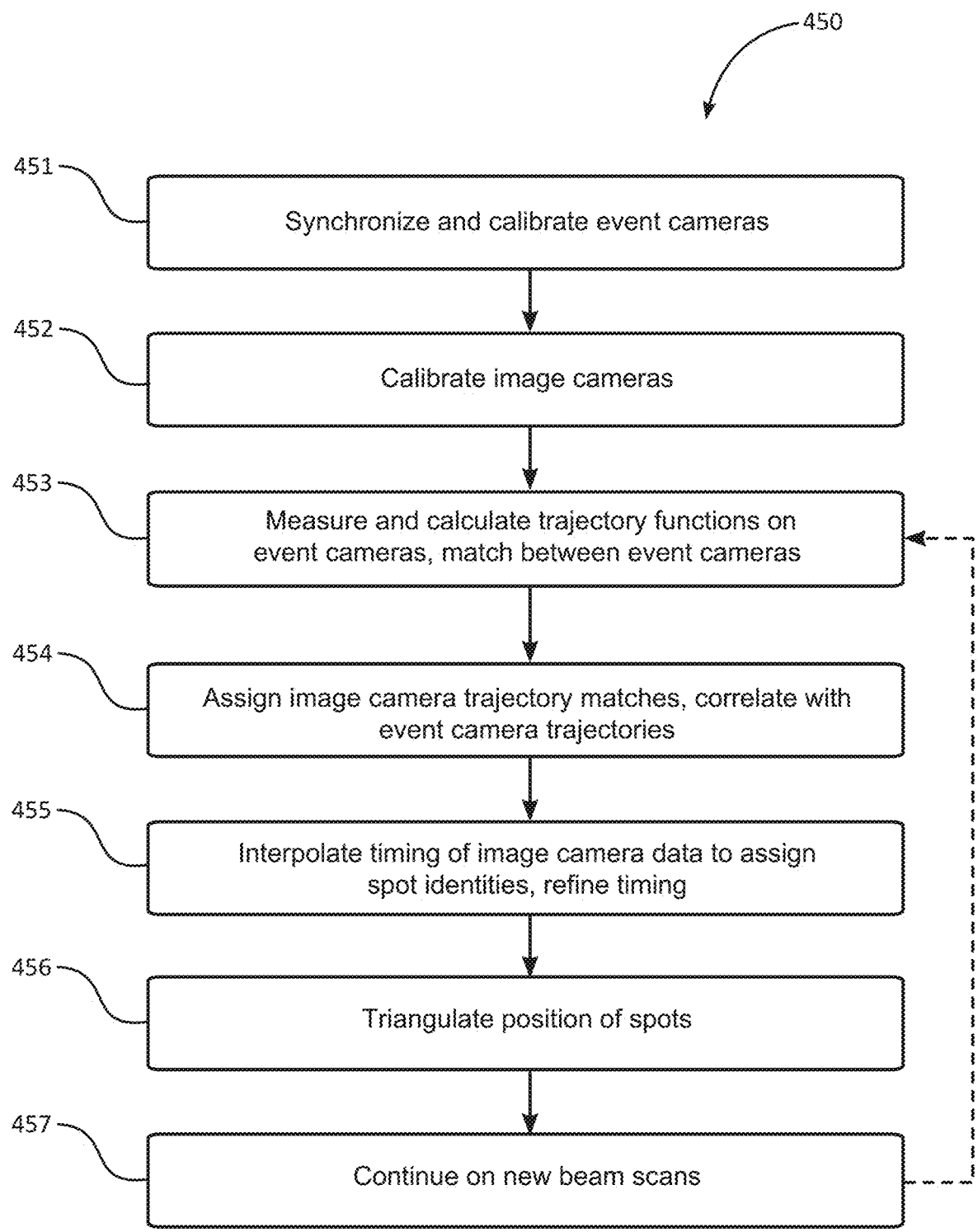
FIG. 4C shows a flowchart of process 450 for perceiving scene features using event sensors and image sensors in accordance with one or more of the various embodiments.

Even when spots and trajectories as seen on a frame camera are fairly dense, identification using event cameras is still possible. We'll first address embodiments where the optical centers of each image sensor camera are co-located with an associated event camera. As mentioned previously, this configuration simplifies assigning timestamps and ordering on spots or trajectories as captured by the image sensor. A simplified process flow 450 is shown in FIG. 4C. In step 451, the event cameras are calibrated using methods as described before both intrinsically and extrinsically, and the time base of each camera are synchronized. The same is done for the substantially co-located image sensor cameras in step 452. Though they are considered co-located, there may still be minor discrepancies that should be corrected for. In addition, simple scans over the fields of view of the cameras may establish a more precise angular map from the projection of the event sensor array and the image sensor array. Because the timestamps of various event cameras have already been synchronized, related events corresponding to spots captured on different image sensors may help pinpoint spots that might be considered matching on the sensor. This might be simple if only one beam scanner were moving through the scene at a time, but multiple beams may be tracked as well. Using the spot positions, epipolar matching of the spot positions may rule out many possible matches of spots with similar timestamped events. This may be possible since the event cameras (and associated image sensor cameras) have been previously calibrated. There may remain some ambiguity though, as an epipolar match may not guarantee a match at a certain point, but rather it describes a match of a point on one camera to a line on another.

However, in most cases multiple points may be compared to one another at the same time to minimize residuals. In embodiments where events are assembled into trajectory paths, the trajectories may be fit to functional forms and either compared directly or sampled along their paths in step 453. If trajectories from a plurality of cameras may be compared to each other, multiple points from each path may be checked by minimizing the epipolar residual at each point with a matching timestamp among the cameras. A set of trajectories that have the lowest epipolar residual are the most likely to be corresponding matches between cameras. This has an additional advantage in reducing the computation for matching points, as far fewer points in each trajectory need be compared to each other along each trajectory. In this case, once matched, the spots captured along each trajectory may also be part of the matched trajectory on another sensor, and the individual spots on image sensors may be thus matched with corresponding spots on other image sensors. Matching timestamps may be done at the event level, but it may be more accurate to first fit the set of events with time-parameterized functions. In this case, the timing of the entire path may be ascertained; when this is then mapped to the stream of dots forming the trajectory on the image sensor, then the function may be further corrected given the more precise determination of position on the image sensor as compared to the event sensor in step 454. Though this step may be done directly using the mapping of image sensor space to event sensor space on a spot-by-spot basis, in some embodiments, likely trajectories comprised of spots that appear to be in close proximity as well as following a smooth curve on the image sensor of each camera might be identified first for matching to overall event camera trajectories. In either case, the image sensor trajectories or spots may then be more highly refined by calculating the exact centroid of the spots (xc, yc) for each camera after matching.

The timing of spots on the image cameras may be calculated directly by interpolation of timing from event camera trajectories in step 455. Further refinement of the time-parameterized function may be done using the data from beam modulation. In many cases, the timing of the modulation to create spots may be more tightly controlled and known at higher than the resolution of what an event camera may report; when matched to the event stream, the timing of which dot was created by which modulation may be matched and assigned according to the modulation timing. Absent the associated timestamped events along a beam trajectory, the timing of modulation may be far less useful, since it cannot be observed on the image sensor frame alone, but when correlated to the events, the likely range of positions of each modulated pulse may be determined. Based on direction and movement of the trajectory, the ordering and position of individual dots may be assigned with higher confidence. Each spot may now have a coordinate of the form (xc, yc, tc) with tc being the refined timestamp of the beam as captured at the centroid position for each camera. For instance, for a matching spot that is visible to three different cameras, there would be three points, (xc1, yc1, tc), (xc2, yc2, tc), (xc3, yc3, tc), where each point might correspond to the same spot as imaged on the different image cameras, and the individual (x, y) coordinates are in each respective image camera sensor coordinate space. Note that all three points have the same timestamp as they have been identified to be produced by the same stimulus spot reflected from the object in the scene.

In some embodiments, there are still ambiguities remaining after the epipolar matching process. These may be resolved using graph crossings. Trajectories that appear to cross on each event camera may cross at particular timestamps, even if the crossing is virtual and happens at two different times; this is the most likely case and happens if a trajectory passes over another trajectory at a later time. This crossing and others may be tracked at each camera. Based on the different perspectives of each camera, these trajectories may appear distorted from each other, but with a similar geometric positioning, yet trajectory crossings happen at substantially the same time on each camera. Time sequencing as well as these geometric relationships may allow matching between groups of trajectories which are associated as a graph. This process has been described elsewhere with regard to matching trajectories on event camera signals but may also be used here to match associated trajectories (which may comprise separate spots) on the image sensors as well.

In specific embodiments, all image sensor cameras may be synchronized so that their frames are synchronized with each other. This may simplify certain steps, since all elements that appear in more than one image camera should be able to be matched up within that time frame. However, this is not strictly necessary. In some embodiments, image sensor cameras may be run unsynchronized with each other, while noting the times of frame capture (which may still generally be much slower than the time scale of event sensor data). For each camera, events may be matched within that time window to a particular spot or trajectory on the image sensor. If a matching spot or trajectory shows up later on an upcoming unsynchronized frame of another image camera with similar criteria, it may be matched to the data from the first camera. In some embodiments, image sensor cameras may even be run at different rates, different resolutions, or both.

In step 456, the position of 3-D points on the surface may be calculated using triangulation. Here, the spatial and time resolution of the 3-D points is much improved because matching spots from the image sensors may use the refined high-resolution coordinate to calculate the point. In specific embodiments, triangulation may be done in a binocular manner, using calibration between sets of two cameras to calculate the 3-D point at that position. In specific embodiments, triangulation may be done in a trinocular manner, where a previously calibrated trifocal tensor or other similar methods are used to determine the 3-D point. In either case, these calculations may be done for each spot, however the spots were the result of a smoothly scanning beam over the surface, thus these points which were determined with curve-fit functions in the 2-D camera space would also have a 3-D trajectory on the object surface in 3-D space. The spots as calculated could be fit to a 3-D time-parametric curve function that would further describe the surface, and either the spots alone, the 3-D curve, or both could be used in characterization or other analysis of objects in the scene. In step 457, the process is repeated with additional scans over the scene.

Figure 4D:
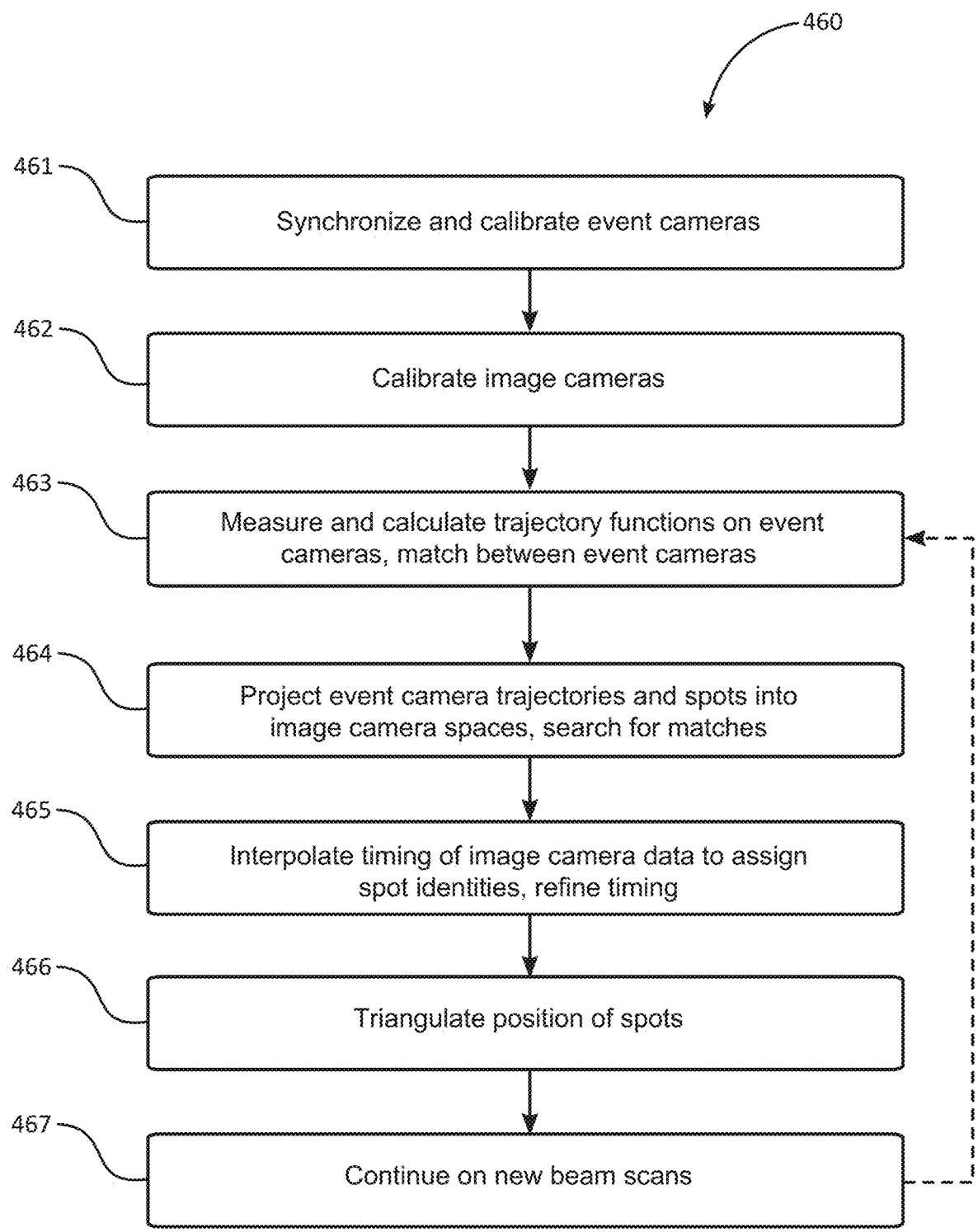
FIG. 4D shows a flowchart of process 460 for perceiving scene features using event sensors and image sensors in accordance with one or more of the various embodiments.

In other embodiments where one or more image sensor cameras are located with optical centers and axes substantially different from event cameras, spots and curves may still be matched even with densely-packed elements. This process is shown in FIG. 4D as process 460. In step 461, event cameras are calibrated similar to step 451. In step 462, the positions and orientations of image sensor cameras may also be located through various means such as bundle adjustments and other techniques. Graph crossings are useful elements that are relatively invariant in distribution and timing across the various cameras and may be used for image camera calibration. Once these have been located by the event camera subsystem, the positions of the crossings as well as the positions of the trajectories that cross may be calculated using triangulation of the trajectories in the event camera space and translated into 3-D world space. When all cameras in the system are well-calibrated, dots and trajectories on each image sensor within a frame of each image camera may be identified to be matched. Step 463 is similar to step 453, where event camera data is used to determine scan trajectories, which are then matched with each other.

Commonly, matching features for triangulation or other purposes such as image stitching may be extremely computationally intense, with the problem becoming progressively worse as the number of features to be matched grows. This is particularly true in these cases where image cameras are not co-located with event cameras; occlusion of certain features as well as different perspectives as well as limitations on how much of the field of view (FOV) of each camera overlaps with all the other cameras means that features that show up on some cameras may not appear on others in the system. The search space in image sensor space when translated to other cameras may be quite large and uncertain. This process is far more efficient when combined with known event camera data. Because of the event timestamps, dots, trajectories, and graph crossings on the event sensors may be identified and matched to subpixel precision. In step 464, because the 3-D world space location of each scanned feature (e.g. dots, trajectories, etc.) is then known at a particular time, the position may be projected into the image sensor space of each image camera to see if it should be visible within the camera's FOV. The position of the features may be known arbitrarily close depending on the accuracy of calibration, whether objects or cameras are moving, and other factors. However, at least the approximate position may be calculated of various features. Exact identification may be corroborated using epipolar matching between different cameras (either event or image), but also because graph crossings of a number of features in the scene may tie two or more trajectories together and make their identification simpler. If a search within a portion of a frame must be done to carefully match features from two or more image cameras, a much smaller portion of the frame may be chosen from each frame for comparison, further reducing the search space and increasing the speed. In some embodiments, this speed may be increased by requiring less I/O for retrieving image data for computation, particularly if only portions of the image frame need be read for analysis; this may be the case particularly when there are relatively fewer features in the scene that may not require analysis of the entire frame. Steps 465-467 are substantially similar as described in steps 455-457 respectively, with some exceptions. Because the image cameras are not co-located with event cameras, as mentioned there may be spots or other featured that are detected on some cameras that are missed by others. In this case, triangulation may be achieved at lower resolution for certain portions of the 3-D surface but may be improved where positive matching of one or more image cameras may be used to refine position and/or timing of some or all points along the trajectory.

In some embodiments, triangulation of 3-D surfaces might be accomplished even with only one event camera as part of the system. There may be fewer computational advantages with this setup, since improvements increasing matching speed and lowering computation come from locating points in 3-D space to limit image camera projections. With a single event camera, there are no features that could be directly matched to another event camera to reduce the feature matching search to a small area of each image camera. However, there are still certain advantages. In an example, a system may be similar to system 100 in FIG. 1, but having only image sensor 111, image sensor 113, and image sensor 115 along with a single event sensor 121. In specific embodiments, event sensor 121 may be placed substantially on the center of the three image cameras. Although the position of beam scanner 101 may be placed arbitrarily, in specific embodiments, it may be substantially co-located with event sensor 121. All cameras in the system may still be well-calibrated for position and orientation. As a beam is scanned over the scene and objects therein, events and trajectories may still be captured at event sensor 121. Image sensors might capture modulated spots that are part of these trajectories, or might instead see relatively continuous trajectories as well. Each image sensor may be used along with the event sensor for triangulation. For this purpose, matching portions in each image frame need to be matched to the event trajectories. The time of matching trajectories may be limited to the frame start and stop time in each image camera. In addition, geometric shapes and relative positions could be used to reduce the matching search. In specific embodiments, graph crossings could be used to aid identification of matching trajectories. In that case, a set of trajectories that cross one another (which in some cases might be a beam crossing itself at a later time) would have a defined set of crossings, where certain trajectories cross each other in a define relationship on each event and image sensor. The timing of the crossings could only be identified on the single event sensor, but this could be used to limit which trajectories might be useful for identification. Successful matches would reduce the time needed for other matches. For example, if a feature such as a trajectory may be matched with high probability between event sensor 121 and image sensor 111, then the points and spots in the trajectory may be triangulated into 3-D space. These points or trajectories might then be projected back into the image sensor spaces of image sensor 113 and 115 to find likely matches there. Once trajectories have been matched at other cameras, all of that data may be eliminated from all cameras where a positive match was ascertained, which then reduces the complexity of searching for matching features on all cameras.

In specific embodiments with only a single event sensor, objects in the scene are either stationary, or else the beams are being scanned at high enough rate so that objects do not move very much from frame to frame. In this case, further improvements are possible once frames from one or more cameras have been matched well to the event camera frame. When the beam is scanned with relatively predictable scanning patterns, these may continue to be tracked by the event camera over time. Because the object is first assumed to be moving slowly or not at all, as the beam is captured quickly by the event sensor 121, it's position on the 3-D object surface may be approximated. At this point, knowing the approximate position as well as the projection in the event camera space, the rough direction of that point may then be projected to each image sensor 111, 113, and 115. Thus, the geometric features such as shape, graph crossings, and the like may be searched for on each image sensor in a much smaller pixel space, greatly increasing the efficiency of measuring the object over time. In some cases, a large number of matches may be found quickly, confirming that the position of the object has not changed much, and further refining its shape. However, if matches found are sparse, this may be an indication that the object is moving faster than originally assumed, or else some features of the shape of the object were not captured fully in previous frames which skew the projective matches. In either case, the fuller search as described earlier may be done again.

In some embodiments, beam scanners may be modulated in time, intensity, or both to change signal captured on one or both of event cameras and image cameras. Such changes may decrease the amount of data needed for analysis, or otherwise simplify calculations. In specific embodiments, the beam may be modulated to appear as spots on the image sensors, but also appear as connected trajectory paths on event sensors. Because the resolution of the image sensors is much higher than most event sensors, resolvable spots on an image sensor (where there are visible darker pixels between adjacent spots along a scanning trajectory) may only trigger events on adjacent pixels. Though the fit timestamps may not have a one-to-one correspondence in this case between resolvable spots on an event sensor with a matching one on an image sensor, there may still be a correspondence along the trajectory that may be fit to the proper place on the frame of the image camera. The event camera trajectory may still be used to find nearest matches for searching the image frame. In some embodiments, the curve fit time-parameterized function may be used to pinpoint the timing (and later matching) of image sensor spots, while in other embodiments, the time-parameterized function may be used as a guide in finding the spots for time sequencing of spots while modulation timing is used to pinpoint exact spot timing to refine the curves as previously mentioned. In specific embodiments, the modulation between spots may be configured so that spots are perceptible on both the event cameras as well as the image sensor cameras. In this case, the spots may be matched up among the various cameras more directly.

Figure 5A:
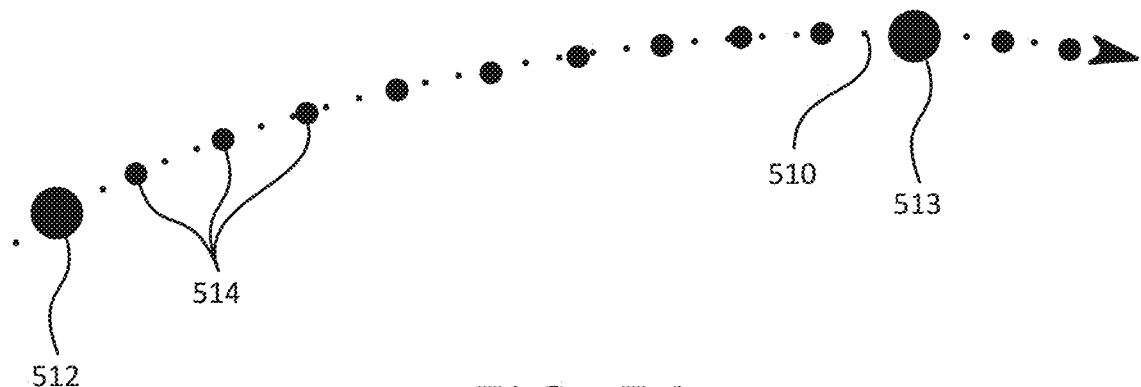
FIG. 5A shows an example trajectory for a scanned path for perceiving scene features using event sensors and image sensors in accordance with one or more of the various embodiments.

In specific embodiments, the intensity of the spots may be modulated individually. In one example, FIG. 5A shows a sample trajectory 510 of a scanned path. The spots are traced out along the trajectory as before, but intensity varies. Spots 512 and 513 are higher intensity as compared to a string of spots 514 along the path. Typically, event sensors work by seeing large changes of light at a sensor pixel, whether they are event cameras, avalanche photodiodes, PMTs, or others. The intensity of the beam may be modulated so that the event sensors registered spots 512 and 513, but the intensity of spots 514 along the path don't trigger events, and so are generally not seen by the event sensors. The image sensors see light in grayscale and would be configured so that they may ascertain spots 514. Event camera data is primarily used to localize spot positions for both matching and triangulation, so larger spots such as 512 and 513 may be used to track the overall trajectories of the beam but with far less data to analyze. Data analysis may be accomplished with far fewer computational steps. Both higher and lower intensity spots may be captured on the image sensor arrays, and these may be distinguished from one another. Once the high intensity points have been identified and matched on the image cameras, the internal lower intensity spots 514 may be used to interpolate the curve along the trajectory. Although epipolar, graph, and other geometric constraints may be used to match spots as mentioned before, in specific embodiments, other modulation may be done to help distinguish them. For instance, the pattern of a particular beam scanned may be different than that of another beam, e.g. one beam may have nine lower intensity spots between every high intensity spot, and another may have ten, and so forth. Other coding schemes may be used.

Figure 5B:
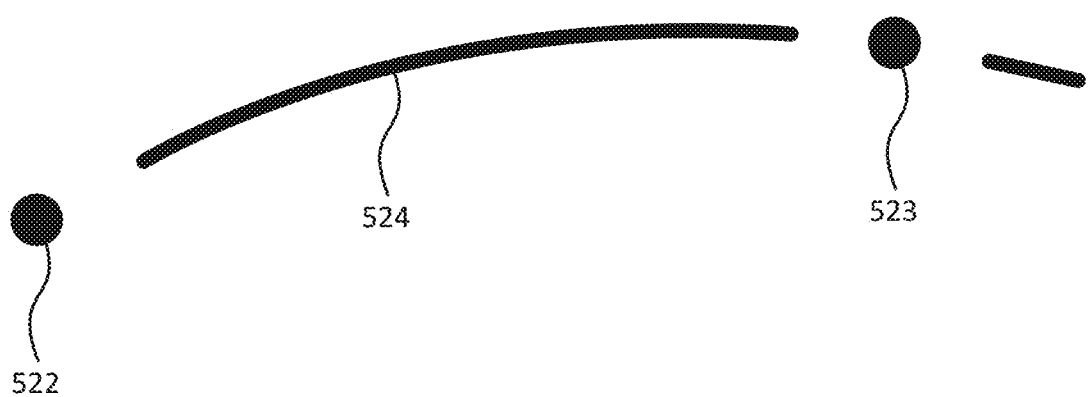
FIG. 5B shows an example trajectory for a scanned path for perceiving scene features using event sensors and image sensors in accordance with one or more of the various embodiments.

In specific embodiments, other patterns could be used as well. FIG. 5B shows a similar trajectory as FIG. 5A, but instead shows two higher intensity spots 522 and 523 along with path 524, which may or may not be lower intensity as the other spots 522 and 523. The path 524 have enough light to trigger events on the event cameras, or in some embodiments, may be configured to only appear or the frames of the image sensor cameras, where they could be interpolated to provide additional data. In some embodiments, the beam could be modulated in a more continuous fashion. In one example, the intensity of the beam might be higher at the ends of the paths 524, so that the event camera might only trigger on spots 522, 523, and the beginning and end of the path 524. In specific embodiments, there may not be completely separable spots on the image sensor at all. In one example, the intensity of a scanned beam could be modulated relatively smoothly in a sinusoidal or other similar pattern. In this case, the event camera may see portions to appear to be spots where the intensity is higher, but the image camera might see varying brightness and width along a determined trajectory.

Although the invention has been discussed with respect to various embodiments, it should be recognized that the invention comprises the novel and non-obvious claims supported by this disclosure.

Illustrated Operating Environment

Figure 6:
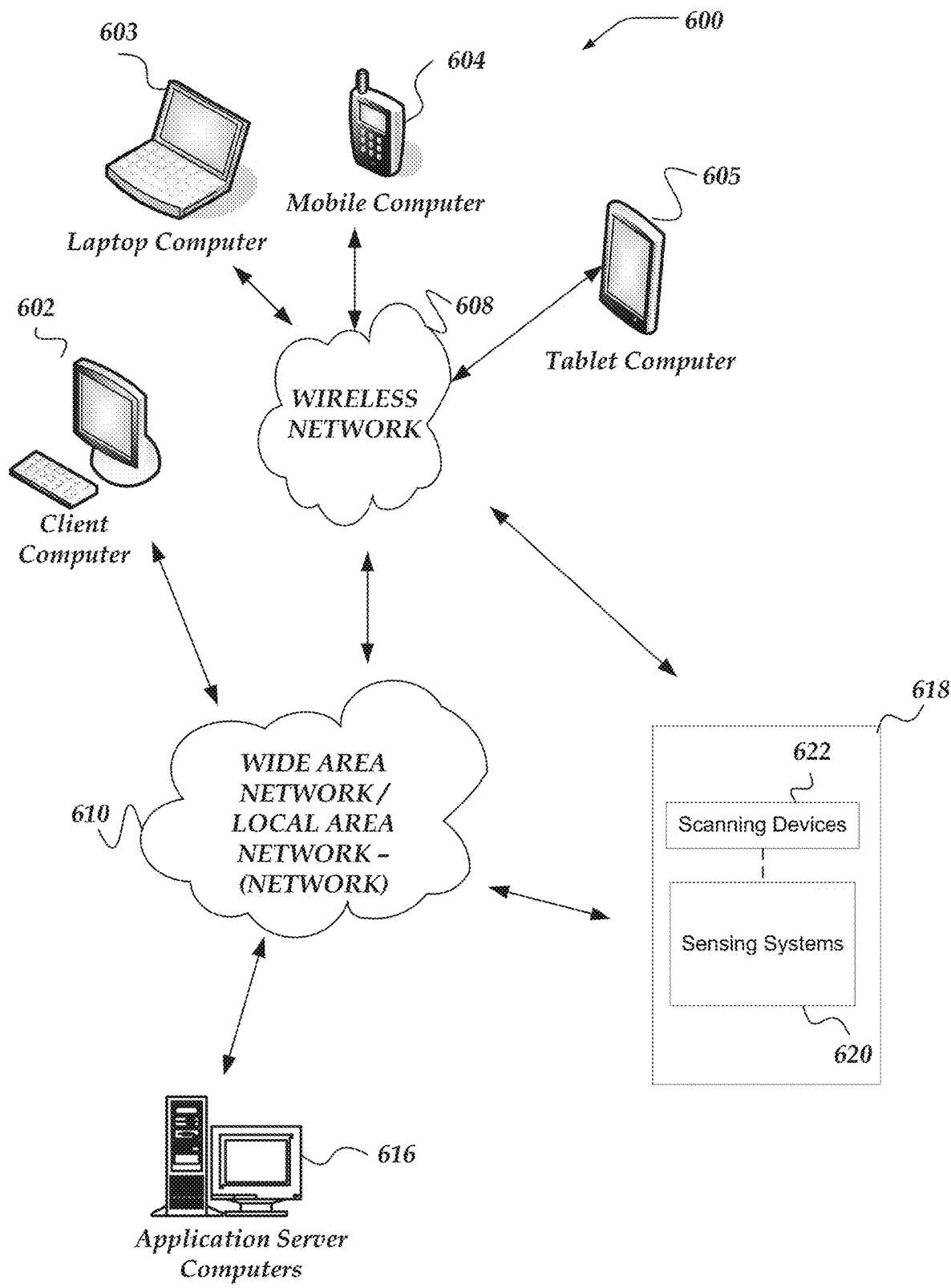
FIG. 6 illustrates a system environment in which various embodiments may be implemented.

FIG. 6 shows components of one embodiment of an environment in which embodiments of the innovations may be practiced. Not all of the components may be required to practice the innovations, and variations in the arrangement and type of the components may be made without departing from the spirit or scope of the innovations. As shown, system 600 of FIG. 6 includes local area networks (LANs)/wide area networks (WANs), such as, network 610, wireless network 608, client computers 602-605, application server computer 616, scanning systems 618, or the like. In some embodiments, scanning systems 618 may include one or more of sensing systems 618, scanning devices 620, or the like.

At least one embodiment of client computers 602-605 is described in more detail below in conjunction with FIG. 8. In one or more embodiments, at least some of client computers 602-605 may operate over one or more wired or wireless networks, such as networks 608, or 610. Generally, client computers 602-605 may include virtually any computer capable of communicating over a network to send and receive information, perform various online activities, offline actions, or the like. In one embodiment, one or more of client computers 602-605 may be configured to operate within a business or other entity to perform a variety of services for the business or other entity. For example, client computers 602-605 may be configured to operate as a web server, firewall, client application, media player, mobile telephone, game console, desktop computer, or the like. However, client computers 602-605 are not constrained to these services and may also be employed, for example, as for end-user computing in other embodiments. It should be recognized that more or less client computers (as shown in FIG. 6) may be included within a system such as described herein, and embodiments are therefore not constrained by the number or type of client computers employed.

Computers that may operate as client computer 602 may include computers that typically connect using a wired or wireless communications medium such as personal computers, multiprocessor systems, microprocessor-based or programmable electronic devices, network PCs, or the like. In some embodiments, client computers 602-605 may include virtually any portable computer capable of connecting to another computer and receiving information such as, laptop computer 603, mobile computer 604, tablet computers 605, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 602-605 typically range widely in terms of capabilities and features. Moreover, client computers 602-605 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one or more embodiments, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one or more embodiments, a user of the client computer may employ the browser application to perform various activities over a network (online). However, another application may also be used to perform various online activities.

Client computers 602-605 also may include at least one other client application that is configured to receive or send content between another computer. The client application may include a capability to send or receive content, or the like. The client application may further provide information that identifies itself, including a type, capability, name, and the like. In one or more embodiments, client computers 602-605 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 616, scanning systems 618, sensing systems 620, scanning devices 622, or other computers.

Client computers 602-605 may further be configured to include a client application that enables an end-user to log into an end-user account that may be managed by another computer, such as application server computer 616, scanning systems 618, sensing systems 620, scanning devices 622, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by sensing systems 620 or scanning devices 622.

Wireless network 608 is configured to couple client computers 603-605 and its components with network 610. Wireless network 608 may include any of a variety of wireless sub-networks that may further overlay stand-alone ad-hoc networks, and the like, to provide an infrastructure-oriented connection for client computers 603-605. Such sub-networks may include mesh networks, Wireless LAN (WLAN) networks, cellular networks, and the like. In one or more embodiments, the system may include more than one wireless network.

Wireless network 608 may further include an autonomous system of terminals, gateways, routers, and the like connected by wireless radio links, and the like. These connectors may be configured to move freely and randomly and organize themselves arbitrarily, such that the topology of wireless network 608 may change rapidly.

Wireless network 608 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 603-605 with various degrees of mobility. In one non-limiting example, wireless network 608 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 608 may include virtually any wireless communication mechanism by which information may travel between client computers 603-605 and another computer, network, a cloud-based network, a cloud instance, or the like.

Network 610 is configured to couple network computers with other computers, including, application server computer 616, scanning systems 618, sensing systems 620, scanning devices 622, client computers 602, and client computers 603-605 through wireless network 608, or the like. Network 610 is enabled to employ any form of computer readable media for communicating information from one electronic device to another. Also, network 610 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices may be remotely connected to either LANs or WANs via a modem and temporary telephone link. In one or more embodiments, network 610 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 616, scanning systems 618 or scanning devices 620 are described in more detail below in conjunction with FIG. 7 or FIG. 8. Although FIG. 6 illustrates application server computer 616, sensing systems 620, and scanning devices 622 each as a single computer, the innovations or embodiments are not so limited. For example, one or more functions of application server computer 616, sensing systems 620, scanning devices 622, or the like, may be distributed across one or more distinct network computers, robot systems, or client computers. Moreover, in one or more embodiments, sensing systems 620 may be implemented using a plurality of network computers. Further, in one or more of the various embodiments, application server computer 616, sensing systems 620, or the like, may be implemented using one or more cloud instances in one or more cloud networks. Also, in some embodiments, application server computer 616, sensing systems 620, and scanning devices 622, or the like, may be included in robotic applications, including stationary (fixed emplacement) robots, mobile robots, or the like, as described herein. Accordingly, these innovations and embodiments are not to be construed as being limited to a single environment, and other configurations, and other architectures are also envisaged.

Illustrative Client Computer

Figure 7:
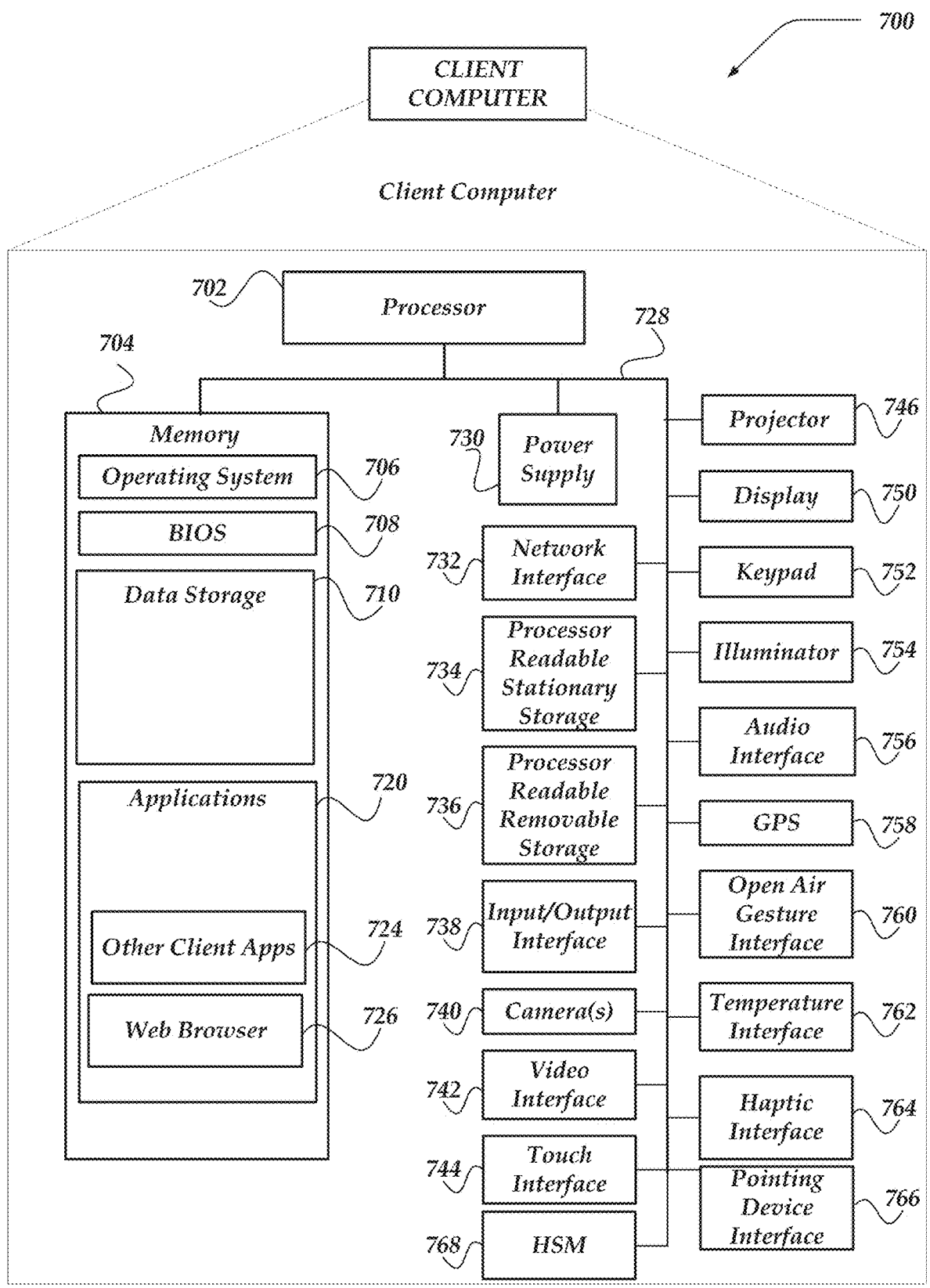
FIG. 7 illustrates a schematic embodiment of a client computer.

FIG. 7 shows one embodiment of client computer 700 that may include many more or less components than those shown. Client computer 700 may represent, for example, one or more embodiments of mobile computers or client computers shown in FIG. 6. Further, scanning devices, mobile phones, scanning devices, or the like, discussed above may be considered client computers that may be arranged in configurations or form factors as described above. In some embodiments, some or all components of client computers, such as client computer 700 may be embedded or included in a vision system.

Client computer 700 may include processor 702 in communication with memory 704 via bus 728. Client computer 700 may also include power supply 730, network interface 732, audio interface 756, display 750, keypad 752, illuminator 754, video interface 742, input/output interface 738, haptic interface 764, global positioning systems (GPS) receiver 758, open air gesture interface 760, temperature interface 762, camera(s) 740, projector 746, pointing device interface 766, processor-readable stationary storage device 734, and processor-readable removable storage device 736. Client computer 700 may optionally communicate with a base station (not shown), or directly with another computer. And in one or more embodiments, although not shown, a gyroscope may be employed within client computer 700 to measuring or maintaining an orientation of client computer 700.

Power supply 730 may provide power to client computer 700. A rechargeable or non-rechargeable battery may be used to provide power. The power may also be provided by an external power source, such as an AC adapter or a powered docking cradle that supplements or recharges the battery.

Network interface 732 includes circuitry for coupling client computer 700 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 732 is sometimes known as a transceiver, transceiving device, or network interface card (NIC).

Audio interface 756 may be arranged to produce and receive audio signals such as the sound of a human voice. For example, audio interface 756 may be coupled to a speaker and microphone (not shown) to enable telecommunication with others or generate an audio acknowledgement for some action. A microphone in audio interface 756 can also be used for input to or control of client computer 700, e.g., using voice recognition, detecting touch based on sound, and the like.

Display 750 may be a liquid crystal display (LCD), gas plasma, electronic ink, light emitting diode (LED), Organic LED (OLED) or any other type of light reflective or light transmissive display that may be used with a computer. Display 750 may also include a touch interface 744 arranged to receive input from an object such as a stylus or a digit from a human hand, and may use resistive, capacitive, surface acoustic wave (SAW), infrared, radar, or other technologies to sense touch or gestures.

Projector 746 may be a remote handheld projector or an integrated projector that is capable of projecting an image on a remote wall or any other reflective object such as a remote screen.

Also, in some embodiments, if client computer 200 may be a scanning device, projector 746 may include one or more signal beam generators, laser scanner systems, or the like, that may be employed for scanning scene or objects as described above.

Video interface 742 may be arranged to capture video images, such as a still photo, a video segment, an infrared video, or the like. For example, video interface 742 may be coupled to a digital video camera, a web-camera, or the like. Video interface 742 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 752 may comprise any input device arranged to receive input from a user. For example, keypad 752 may include a push button numeric dial, or a keyboard. Keypad 752 may also include command buttons that are associated with selecting and sending images.

Illuminator 754 may provide a status indication or provide light. Illuminator 754 may remain active for specific periods of time or in response to event messages. For example, if illuminator 754 is active, it may backlight the buttons on keypad 752 and stay on while the client computer is powered. Also, illuminator 754 may backlight these buttons in various patterns if particular actions are performed, such as dialing another client computer. Illuminator 754 may also cause light sources positioned within a transparent or translucent case of the client computer to illuminate in response to actions.

Further, client computer 700 may also comprise hardware security module (HSM) 768 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 768 may be a stand-alone computer, in other cases, HSM 768 may be arranged as a hardware card that may be added to a client computer.

Client computer 700 may also comprise input/output interface 738 for communicating with external peripheral devices or other computers such as other client computers and network computers. The peripheral devices may include an audio headset, virtual reality headsets, display screen glasses, remote speaker system, remote speaker and microphone system, and the like. Input/output interface 738 can utilize one or more technologies, such as Universal Serial Bus (USB), Infrared, WiFi, WiMax, Bluetooth™, and the like.

Input/output interface 738 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or capture data that is external to client computer 700.

Haptic interface 764 may be arranged to provide tactile feedback to a user of the client computer. For example, the haptic interface 764 may be employed to vibrate client computer 700 in a particular way if another user of a computer is calling. Temperature interface 762 may be used to provide a temperature measurement input or a temperature changing output to a user of client computer 700. Open air gesture interface 760 may sense physical gestures of a user of client computer 700, for example, by using single or stereo video cameras, radar, a gyroscopic sensor inside a computer held or worn by the user, or the like. Camera 740 may be used to track physical eye movements of a user of client computer 700.

Further, in some cases, if client computer 700 may be a scanning device, camera 740 may represent one or more event cameras, one or more frame cameras, or the like.

GPS transceiver 758 can determine the physical coordinates of client computer 700 on the surface of the Earth, which typically outputs a location as latitude and longitude values. GPS transceiver 758 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 700 on the surface of the Earth. It is understood that under different conditions, GPS transceiver 758 can determine a physical location for client computer 700. In one or more embodiment, however, client computer 700 may, through other components, provide other information that may be employed to determine a physical location of the client computer, including for example, a Media Access Control (MAC) address, IP address, and the like.

In at least one of the various embodiments, applications, such as, operating system 706, other client apps 724, web browser 726, or the like, may be arranged to employ geo-location information to select one or more localization features, such as, time zones, languages, currencies, calendar formatting, or the like. Localization features may be used in, file systems, user-interfaces, reports, as well as internal processes or databases. In at least one of the various embodiments, geo-location information used for selecting localization information may be provided by GPS 758. Also, in some embodiments, geolocation information may include information provided using one or more geolocation protocols over the networks, such as, wireless network 608 or network 611.

Human interface components can be peripheral devices that are physically separate from client computer 700, allowing for remote input or output to client computer 700. For example, information routed as described here through human interface components such as display 750 or keyboard 752 can instead be routed through network interface 732 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which may include a remote pico projector along with one or more cameras that remotely communicate with a separately located client computer to sense a user's gestures toward portions of an image projected by the pico projector onto a reflected surface such as a wall or the user's hand.

A client computer may include web browser application 726 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 704 may include RAM, ROM, or other types of memory. Memory 704 illustrates an example of computer-readable storage media (devices) for storage of information such as computer-readable instructions, data structures, program modules or other data. Memory 704 may store BIOS 708 for controlling low-level operation of client computer 700. The memory may also store operating system 706 for controlling the operation of client computer 700. It may be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 704 may further include one or more data storage 710, which can be utilized by client computer 700 to store, among other things, applications 720 or other data. For example, data storage 710 may also be employed to store information that describes various capabilities of client computer 700. The information may then be provided to another device or computer based on any of a variety of methods, including being sent as part of a header during a communication, sent upon request, or the like. Data storage 710 may also be employed to store social networking information including address books, buddy lists, aliases, user profile information, or the like. Data storage 710 may further include program code, data, algorithms, and the like, for use by a processor, such as processor 702 to execute and perform actions. In one embodiment, at least some of data storage 710 may also be stored on another component of client computer 700, including, but not limited to, non-transitory processor-readable removable storage device 736, processor-readable stationary storage device 734, or even external to the client computer.

Applications 720 may include computer executable instructions which, if executed by client computer 700, transmit, receive, or otherwise process instructions and data. Applications 720 may include, for example, other client applications 724, web browser 726, or the like. Client computers may be arranged to exchange communications, such as, queries, searches, messages, notification messages, event messages, sensor events, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 700 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 700 may include one or more hardware microcontrollers instead of CPUs.

In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Figure 8:
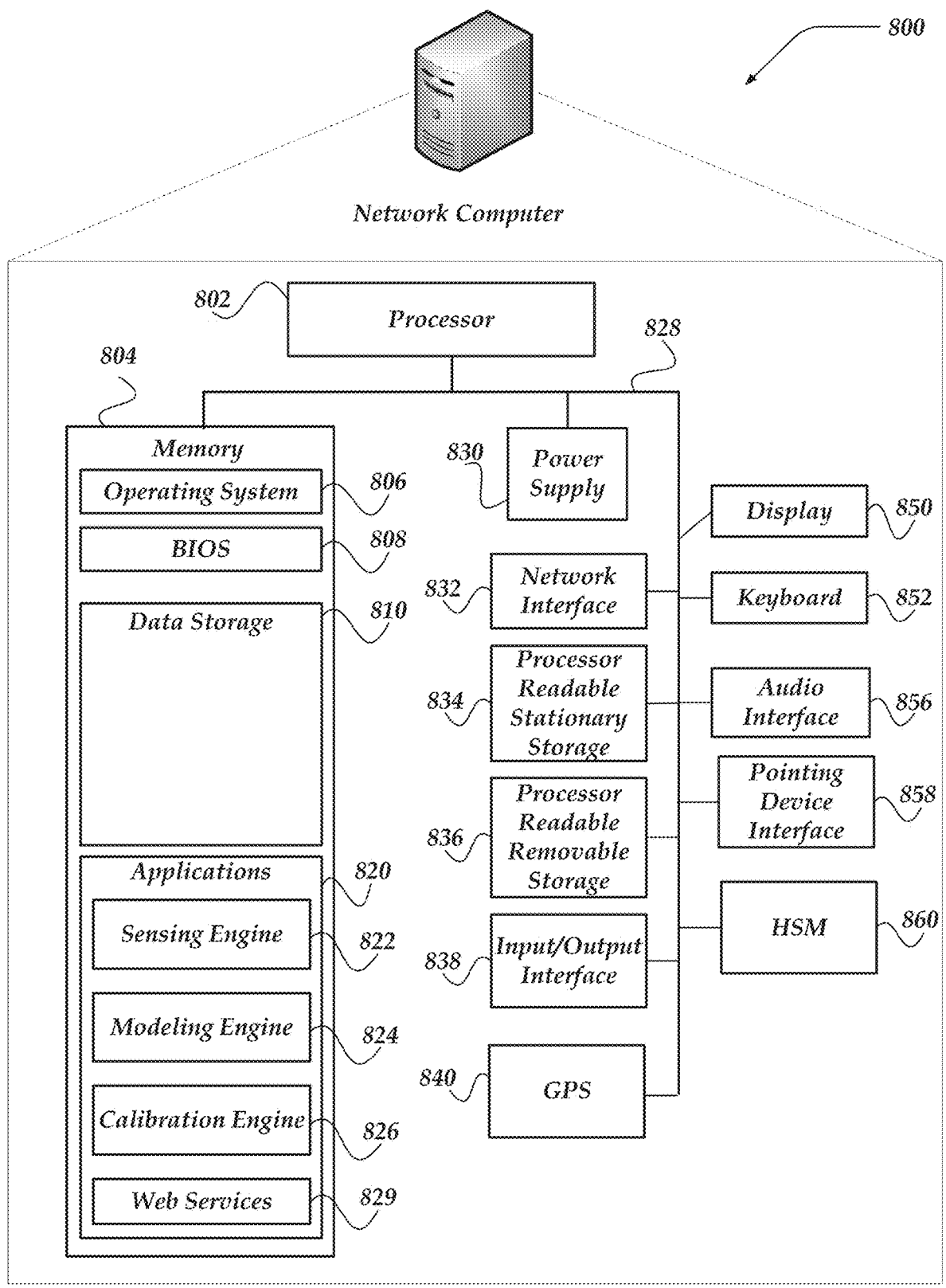
FIG. 8 illustrates a schematic embodiment of a network computer.

Illustrative Network Computer FIG. 8 shows one embodiment of network computer 800 that may be included in a system implementing one or more of the various embodiments. Network computer 800 may include many more or less components than those shown in FIG. 8. However, the components shown are sufficient to disclose an illustrative embodiment for practicing these innovations. Network computer 800 may represent, for example, one embodiment of at least one of application server computer 616, or sensing systems 620 of FIG. 6. In some embodiments, network computers or portions thereof may be embedded or included in robotic systems.

In one or more of the various embodiments, scanning devices, sensing systems, robotic systems, mobile computers, or mobile phones may be arranged to communicate with one or more network computers, such as, network computer 800. In some embodiments, network computers may provide: software/firmware updates; backup storage; communication between or among scanning devices, robotic systems, mobile computers; or the like. In some cases, network computer 800 may be considered part of a cloud-based system that provides computational support for scanning devices, sensing systems, robotics systems, or the like.

Network computers, such as, network computer 800 may include a processor 802 that may be in communication with a memory 804 via a bus 828. In some embodiments, processor 802 may be comprised of one or more hardware processors, or one or more processor cores. In some cases, one or more of the one or more processors may be specialized processors designed to perform one or more specialized actions, such as, those described herein. Network computer 800 also includes a power supply 830, network interface 832, audio interface 856, display 850, keyboard 852, input/output interface 838, processor-readable stationary storage device 834, and processor-readable removable storage device 836. Power supply 830 provides power to network computer 800.

Network interface 832 includes circuitry for coupling network computer 800 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 832 is sometimes known as a transceiver, transceiving device, or network interface card (NIC). Network computer 800 may optionally communicate with a base station (not shown), or directly with another computer.

Audio interface 856 is arranged to produce and receive audio signals such as the sound of a human voice. For example, audio interface 856 may be coupled to a speaker and microphone (not shown) to enable telecommunication with others or generate an audio acknowledgement for some action. A microphone in audio interface 856 can also be used for input to or control of network computer 800, for example, using voice recognition.

Display 850 may be a liquid crystal display (LCD), gas plasma, electronic ink, light emitting diode (LED), Organic LED (OLED) or any other type of light reflective or light transmissive display that can be used with a computer. In some embodiments, display 850 may be a handheld projector or pico projector capable of projecting an image on a wall or other object.

Network computer 800 may also comprise input/output interface 838 for communicating with external devices or computers not shown in FIG. 8. Input/output interface 838 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 838 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or capture data that is external to network computer 800. Human interface components may be physically separate from network computer 800, allowing for remote input or output to network computer 800. For example, information routed as described here through human interface components such as display 850 or keyboard 852 can instead be routed through the network interface 832 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 858 to receive user input.

GPS transceiver 840 can determine the physical coordinates of network computer 800 on the surface of the Earth, which typically outputs a location as latitude and longitude values. GPS transceiver 840 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 800 on the surface of the Earth. It is understood that under different conditions, GPS transceiver 840 can determine a physical location for network computer 800. In one or more embodiments, however, network computer 800 may, through other components, provide other information that may be employed to determine a physical location of the client computer, including for example, a Media Access Control (MAC) address, IP address, and the like.

In at least one of the various embodiments, applications, such as, operating system 806, sensing engine 822, modeling engine 824, calibration engine 826, web services 829, or the like, may be arranged to employ geo-location information to select one or more localization features, such as, time zones, languages, currencies, currency formatting, calendar formatting, or the like.

Localization features may be used in file systems, user-interfaces, reports, as well as internal processes or databases. In at least one of the various embodiments, geo-location information used for selecting localization information may be provided by GPS 840. Also, in some embodiments, geolocation information may include information provided using one or more geolocation protocols over the networks, such as, wireless network 608 or network 610.

Memory 804 may include Random Access Memory (RAM), Read-Only Memory (ROM), or other types of memory. Memory 804 illustrates an example of computer-readable storage media (devices) for storage of information such as computer-readable instructions, data structures, program modules or other data. Memory 804 stores a basic input/output system (BIOS) 808 for controlling low-level operation of network computer 800. The memory also stores an operating system 806 for controlling the operation of network computer 800. It may be appreciated that this component may include a general-purpose operating system such as a version of UNIX®, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 804 may further include one or more data storage 810, which can be utilized by network computer 800 to store, among other things, applications 820 or other data. For example, data storage 810 may also be employed to store information that describes various capabilities of network computer 800. The information may then be provided to another device or computer based on any of a variety of methods, including being sent as part of a header during a communication, sent upon request, or the like. Data storage 810 may also be employed to store social networking information including address books, buddy lists, aliases, user profile information, or the like. Data storage 810 may further include program code, data, algorithms, and the like, for use by a processor, such as processor 802 to execute and perform actions such as those actions described below. in one or more embodiments, at least some of data storage 810 may also be stored on another component of network computer 800, including, but not limited to, non-transitory media inside processor-readable removable storage device 836, processor-readable stationary storage device 834, or any other computer-readable storage device within network computer 800, or even external to network computer 800.

Applications 820 may include computer executable instructions which, if executed by network computer 800, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 820 may include sensing engine 822, modeling engine 824, calibration engine 826, web services 829, or the like, which may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, sensing engine 822, modeling engine 824, calibration engine 826, web services 829, or the like, may be operative in a cloud-based computing environment. In one or more of the various embodiments, these applications, and others, which comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to sensing engine 822, modeling engine 824, calibration engine 826, web services 829, or the like, may be provisioned and de-commissioned automatically.

Also, in one or more of the various embodiments, sensing engine 822, modeling engine 824, calibration engine 826, web services 829, or the like, may be located in virtual servers running in a cloud-based computing environment rather than being tied to one or more specific physical network computers.

Further, network computer 800 may also comprise hardware security module (HSM) 860 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 860 may be a stand-alone network computer, in other cases, HSM 860 may be arranged as a hardware card that may be installed in a network computer.

Additionally, in one or more embodiments (not shown in the figures), network computer 800 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Figure 9:
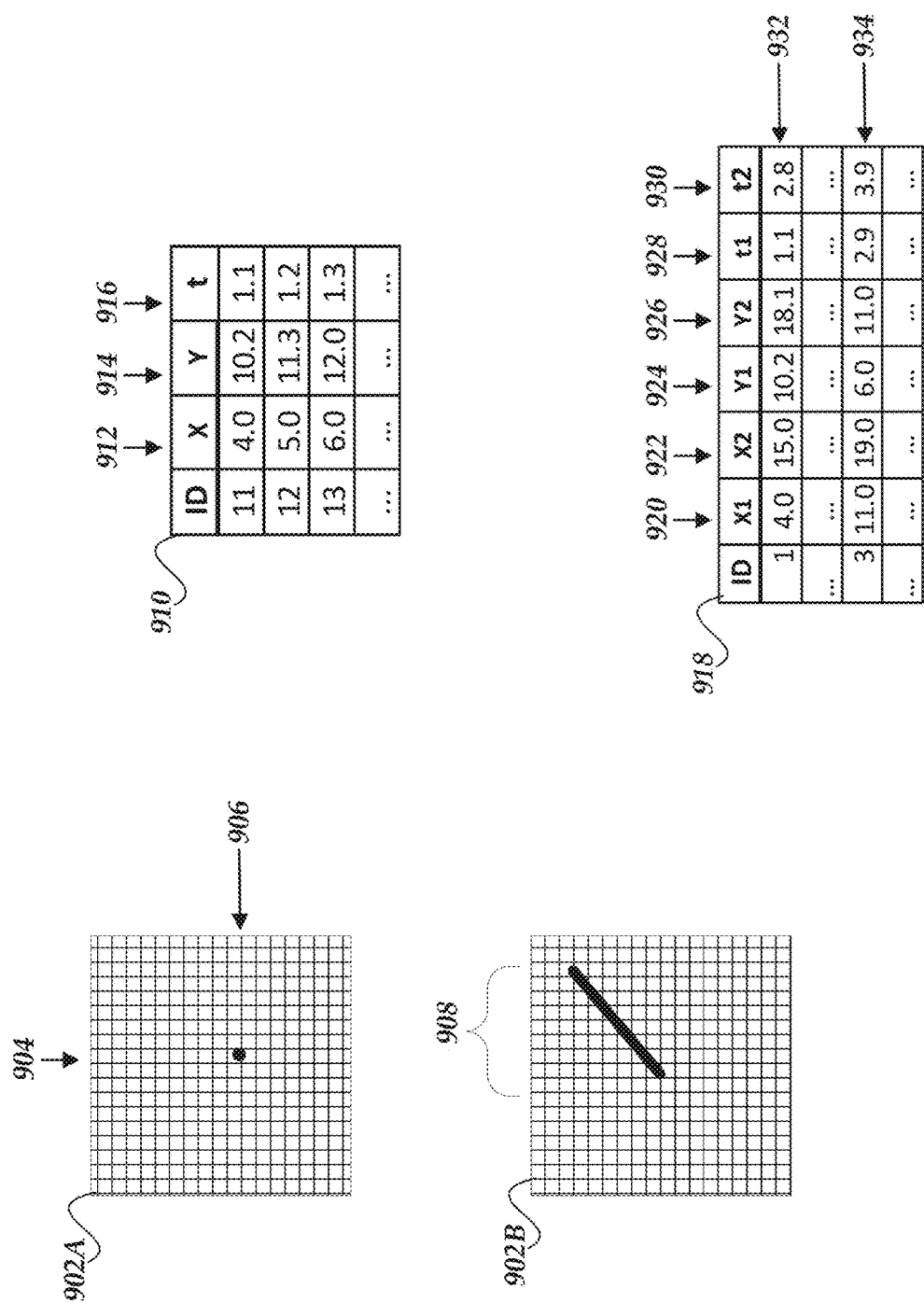
FIG. 9 illustrates a logical representation of sensors and sensor output information for perceiving scene features using event sensors and image sensors in accordance with one or more of the various embodiments.

FIG. 9 illustrates a logical representation of sensors and sensor output information for perceiving scene features using event sensors and image sensors in accordance with one or more of the various embodiments.

In one or more of the various embodiments, sensing systems, such as multi-camera system 100 (See, FIG. 1) may be provided sensor output from various sensors. In this example, for some embodiments, sensor 902A may be considered to represent a generic sensor that may emit signals that correspond to the precise location on the sensor where reflected energy from the scanning signal generator may be detected. For example, sensor 902A may be considered an array of detector cells that reports the cell location of the cell that has detected energy reflected from the scanning signal generator. In this example, horizontal location 904 and vertical location 906 may be considered to represent a location corresponding to the location in sensor 902 where reflected signal energy has been detected. Accordingly, sensor 902 may be considered a sensor that may be part of an event camera that may be included in a multi-camera sensing system, such as, system 100, or the like, where the signal energy may be provided scanning lasers and the reflect signal energy may be considered the laser light that may be reflected from one or more objects or surfaces in the scene.

In one or more of the various embodiments, sensing engines may be arranged to receive sensor information for one or more detection events from one or more sensors. Accordingly, in some embodiments, sensing engines may be arranged to determine additional information about the source of the reflected energy (beam location on scanned surface) based on triangulation or other methods. In some embodiments, if sensing engines employ triangulation or other methods to locate the location of the signal beam in the scanning environment, the combined sensor information may be considered a single sensor event comprising a horizontal (x) location, vertical location (y) and time component (t). Also, in some embodiments, sensor event may include other information, such as, time-of-flight information depending on the type or capability of the sensors.

Further, as described above, the scanning signal generator (e.g., scanning laser) may be configured to traverse a known precise path/curve (e.g., scanning path). Accordingly, in some embodiments, the pattern or sequence of cells in the sensors that detect reflected energy may follow a path/curve that is related to the path/curve of the scanning signal generator. Accordingly, in some embodiments, if the signal generator scans a particular path/curve a related path/curve of activated cells in the sensors may be detected. Thus, in this example, for some embodiments, path 908 may represent a sequence of cells in sensor 902B that have detected reflected energy from the scanning signal generator.

In one or more of the various embodiments, sensing engines may be arranged to fit sensor events to the scanning path curve. Accordingly, in one or more of the various embodiments, sensing engines may be arranged to predict where sensor events should occur based on the scanning path curve to determine information about the location or orientation of scanned surfaces or objects. Thus, in some embodiments, if sensing engines receive sensor events that are unassociated with the known scanning path curve, sensing engines may be arranged to perform various actions, such as, closing the current trajectory and beginning a new trajectory, discarding the sensor event as noise, or the like.

In one or more of the various embodiments, scanning path curves may be configured in advance within the limits or constraints of the scanning signal generator and the sensors. For example, a scanning signal generator may be configured or directed to scan the scanning environment using various curves including Lissajous curves, 2D lines, or the like. In some cases, scanning path curves may be considered piecewise functions in that they may change direction or shape at different parts of the scan. For example, a 2D line scan path may be configured to change direction if the edge of the scanning environment (e.g., field-of-view) is approached.

One of ordinary skill in the art will appreciate that if an unobstructed surface is scanned, the scanning frequency, scanning path, and sensor response frequency may determine if the sensor detection path appears as a continuous path. Thus, the operational requirements of the scanning signal generator, sensor precision, sensor response frequency, or the like, may vary depending on application of the system. For example, if the scanning environment may be relatively low featured and static, the sensors may have a lower response time because the scanned environment is not changing very fast. Also, for example, if the scanning environment is dynamic or includes more features of interest, the sensors may require increased responsiveness or precision to accurately capture the paths of the reflected signal energy. Further, in some embodiments, the characteristics of the scanning signal generator may vary depending on the scanning environment. For example, if lasers are used for the scanning signal generator, the energy level, wavelength, phase, beam width, or the like, may be tuned to suit the environment.

In one or more of the various embodiments, sensing engines may be provided sensor output as a continuous stream of sensor events or sensor information that identifies the cell location in the sensor cell-array and a timestamp that corresponds to if the detection event occurred.

In this example, for some embodiments, data structure 910 may be considered a data structure for representing sensor events based on sensor output provided to a sensing engine. In this example, column 912 represents the horizontal position of the location in the scanning environment, column 914 represents a vertical position in the scanning environment, and column 916 represents the time of the event. Accordingly, in some embodiments, sensing engines may be arranged to determine which (if any) sensor events should be associated with a trajectory. In some embodiments, sensing engines may be arranged to associate sensor events with existing trajectories or create new trajectories. In some embodiments, if the sensor events fit an expected/predicted curve as determined based on the scanning path curve, sensing engines may be arranged to associate the sensor events with an existing trajectory or create a new trajectory. Also, in some cases, for some embodiments, sensing engines may be arranged to determine one or more sensor events as noise if their location deviates from a predicted path beyond a defined threshold value.

In one or more of the various embodiments, sensing engines may be arranged to determine sensor events for each individual sensor rather than being limited to provide sensor events computed based on outputs from multiple sensors. For example, in some embodiments, sensing engines may be arranged to provide a data structure similar to data structure 910 to collect sensor events for individual sensors.

In some embodiments, sensing engines may be arranged to generate a sequence of trajectories that correspond to the reflected energy/signal paths detected by the sensors. In some embodiments, sensing engines may be arranged to employ one or more data structures, such as, data structure 918 to represent a trajectory that may be determined based on the information captured by the sensors. In this example, data structure 910 may be table-like structure that includes columns, such as, column 920 for storing a first x-position, column 922 for storing a second x-position, column 924 for storing a first y-position, column 926 for storing a second y-position, column 928 for storing the beginning time of a trajectory, column 930 for storing an end time of a trajectory, of the like.

In this example, row 932 represents information for a first trajectory and row 934 represents information for another trajectory. As described herein, sensing engines may be arranged to employ one or more rules or heuristics to determine if one trajectory ends and another begins. In some embodiments, such heuristics may include observing the occurrence sensor events that are geometrically close or temporally close. Note, the particular components or elements of a trajectory may vary depending on the parametric representation of the analytical curve or the type of analytical curve associated with the scanning path and the shape or orientation of the scanned surfaces. Accordingly, one of ordinary skill in the art will appreciate that different types of analytical curves or curve representations may result in more or fewer parameters for each trajectory. Thus, in some embodiments, sensing engines may be arranged to determine the specific parameters for trajectories based on rules, templates, libraries, or the like, provided via configuration information to account for local circumstances or local requirements.

Further, one of ordinary skill in the art will appreciate that in some embodiments, trajectories may be projected/converted into 3-D scene coordinates based on calibration information, such as, the position or orientation of sensors, signal generators (e.g., scanning lasers), or the like.

In one or more of the various embodiments, trajectories may be represented using curve parameters rather than a collection of individual points or pixels. Accordingly, in some embodiments, sensing engines may be arranged to employ one or more numerical methods to continuously fit sequences of sensor events to scanning path curves.

Further, in some embodiments, sensing engines may be arranged to employ one or more smoothing methods to improve the accuracy of trajectories or trajectory fitting. For example, in some embodiments, the scanning curve may be comprised of sensor events triggered by a scanning laser that may not be one cell wide because in some cases reflected energy may spread to adjacent cells, traverse adjacent cells, or land on the border of two or more adjacent cells. Accordingly, in some embodiments, to better estimate the real position of the reflected signal beam as it traverses the sensor plane, sensing engines may be arranged to perform an online smoothing estimate, e.g., using a Kalman filter to predict a position in a trajectory in fractional units of detector cell position and fractional units of the fundamental timestamp of the sensor. Also, in some embodiments, sensing engines may be arranged to employ a batch-based optimization routine such as weighted least squares to fit a smooth curve to continuous segments of the scanning trajectory, which may correspond to if the scanning signal generator beam was scanning over a continuous surface.

Also, in some embodiments, the scanning path may be employed to determine if trajectories begin or end. For example, if the scanning path reaches an edge of a scanning area and changes direction, in some cases, a current trajectory may be terminated while a new trajectory may be started to begin capturing information based on the new direction of the scan. Also, in some embodiments, objects or other features that occlude or obstruct scanning energy or reflected scanning energy may result in breaks in the sensor output that introduce gaps or other discontinuities that may trigger a trajectory to be closed and another trajectory to be opened subsequent to the break or gap. Further, in some embodiments, sensing engines may be configured to have a maximum length of trajectories such that a trajectory may be closed if it has collected enough sensor events or enough time has elapsed from the start of the trajectory.

Also, in some embodiments, sensing engines may be arranged to determine trajectories for individual sensor. Accordingly, in some embodiments, sensing engines may be arranged to provide data structures similar to data structure 918 for each sensor. Thus, the relative position information for different sensors or different collections of the data may be used to compute 3-D coordinates for events or trajectories.

Figure 10:
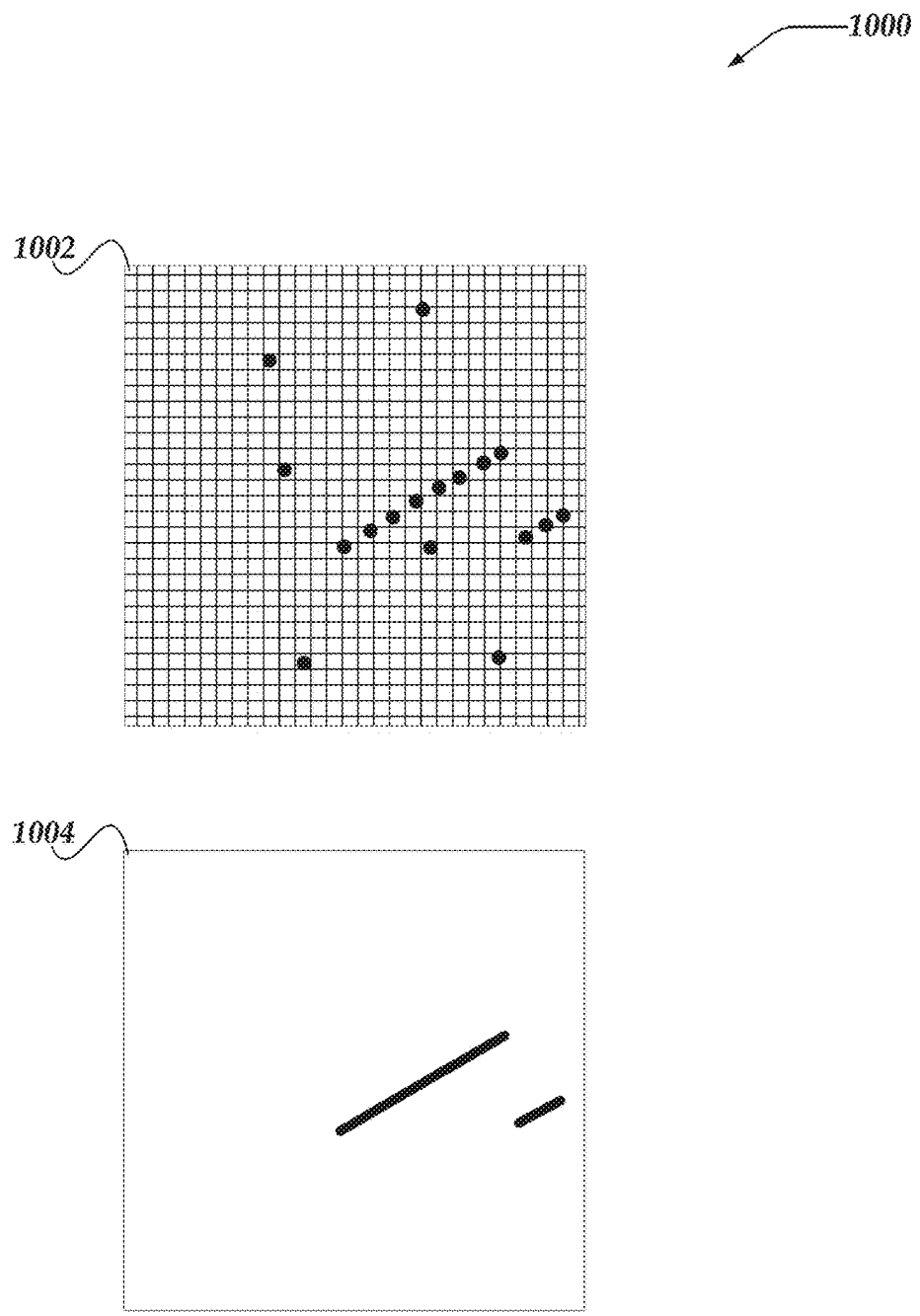
FIG. 10 illustrates a logical schematic of a system for perceiving scene features using event sensors and image sensors in accordance with one or more of the various embodiments.

FIG. 10 illustrates a logical schematic of system 1000 for perceiving scene features using event sensors and image sensors in accordance with one or more of the various embodiments. As described above, in some embodiments, scanning signal generators may scan for surfaces in scanning environments. In some cases, conditions of the scanning environment or characteristics of the scanned surfaces may result in one or more spurious sensor events (e.g., noise) generated by one or more sensors. For example, sensor view 1002 represents a portion of sensor events that may be generated during a scan.

In conventional machine vision applications, one or more 2D filters may be applied to a captured video image, point clusters, or the like, to attempt to separate noise events from the signals of interest. In some cases, conventional 2D image-based filters may be disadvantageous because they may employ one or more filters (e.g., weighted moving averaging, Gaussian filters, or the like) that may rely on statistical evaluation of pixel color/weight, pixel color/weight gradients, pixel distribution/clustering, or the like. Accordingly, in some cases, conventional 2D image filtering may be inherently fuzzy and highly dependent on application/environmental assumptions. Also, in some cases, conventional noise detection/noise reduction methods may erroneously miss some noise events while at the same time misclassifying one or more scene events as noise.

In contrast, in some embodiments, sensing engines may be arranged to associate sensor events into trajectories based on precise heuristics, such as, nearness in time and location that may be used to fit sensor events to analytical curves that may be predicted based on the scanning path. Because scanning paths are defined in advance, sensing engines may be arranged to predict which sensor events should be included in the same trajectory. See, trajectory view 1004.

Further, in some embodiments, if surface or object features create gaps or breaks in trajectories, sensing engines may be arranged to close the current trajectory and start a new trajectory as soon as one may be recognized.

Also, in some embodiments, sensing engines may be arranged to determine trajectories directly from sensor events having the form (x, y, t) rather than employing fuzzy pattern matching or pattern recognition methods. Thus, in some embodiments, sensing engines may be arranged to accurately compute distance, direction, or the like, rather than relying fuzzy machine vision methods to distinguish noise from sensor events that should be in the same trajectory.

In one or more of the various embodiments, calibration engines associated with sensing engines or scanning devices may be arranged to employ rules, instructions, heuristics, or the like, for classifying sensor events as noise that may be provided via configuration information to account for local requirements or local circumstances that may be associated with a sensing applications or sensors.

Figure 11:
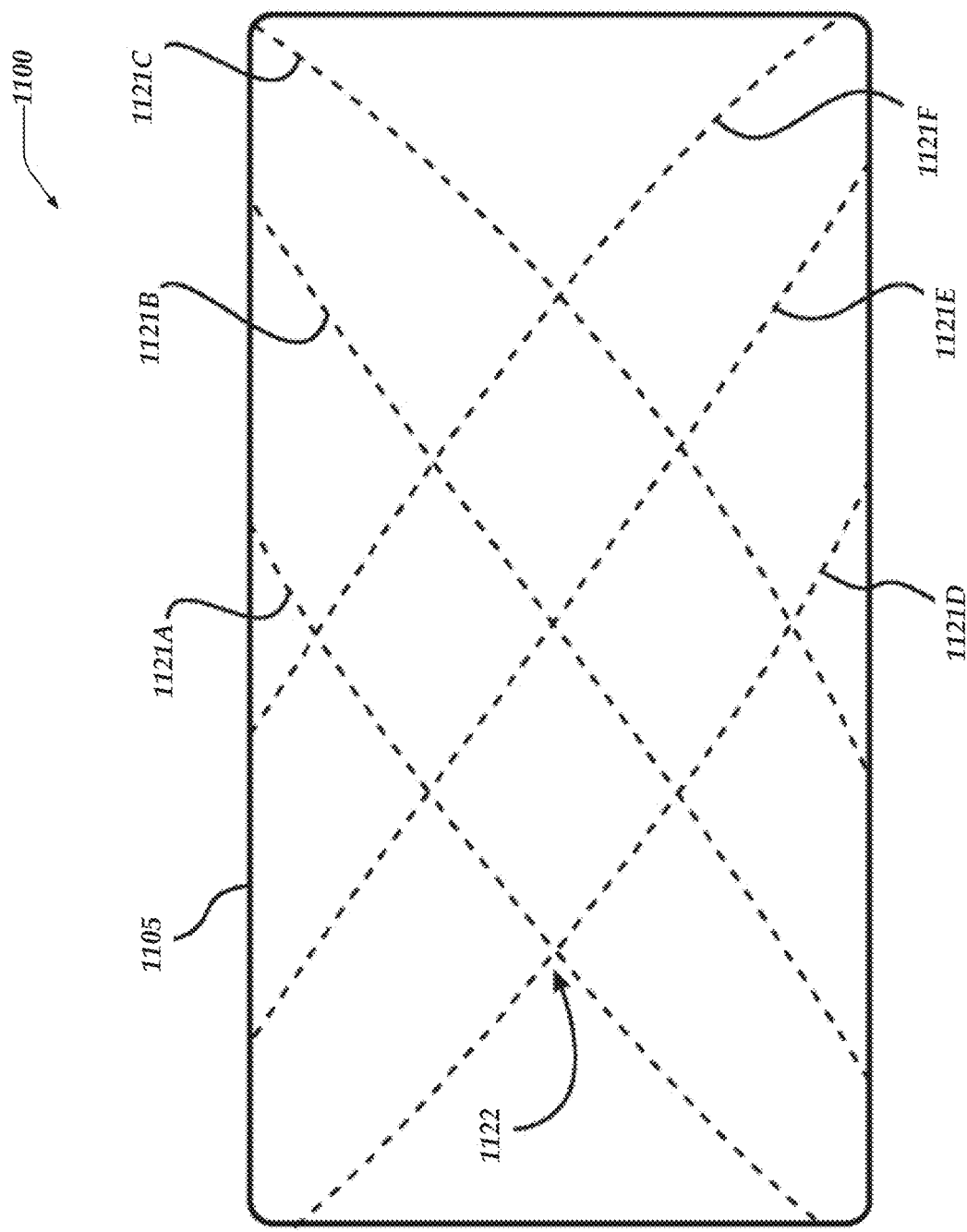
FIG. 11 illustrates how paths associated with scanned beams may traverse over or across a scene in accordance with one or more of the various embodiments.

FIG. 11 illustrates how paths associated with scanned beams may traverse over or across a scene. In this example, scene 1105 represents a scanned surface or area displaying paths 1121A, 1121B, 1121C, 1121D, 1121E, and 1121F, which comprise a subset of the paths on the surface of scene 1105 in accordance with one or more of the various embodiments. A continuous portion of the path may be defined relative to parameters set on event sensors; although continuous paths may be defined in many ways, one way may be that neighboring or near events on a contiguous path as detected by an event sensor may be less than an arbitrary distance away from the preceding event on the path both spatially as well as in time, and generally may be produced by tracing a path on an object over a surface without significant discontinuities. In some embodiments, sensing systems may be arranged to employ rules, instructions, or the like, for determining trajectories or paths from events that may be provided via configuration information to account for local requirements or local circumstances.

In this example, crossing point 1122 may be representative of many crossing points that may occur during the scanning of an object or scene, and may be a point used as an artificial fiducial point. Though not all crossing points in FIG. 11 may be labeled as such, crossing points may be referred to by the paths which cross. For instance, point 1122 may also be named crossing point 1121AD, as this may be the crossing point of the paths 1121A and 1121D. Other crossing points may be referred to in a similar manner. For clarity, paths 1121A-F as shown may be representative of the path of a signal generator beam as it intersects the surface of an object or scene. Accordingly, events as captured on sensors may determine these paths, but may be detected as tilted or skewed differently, since the paths as seen on each sensor may be from the perspective of the sensor in its position.

Figure 12:
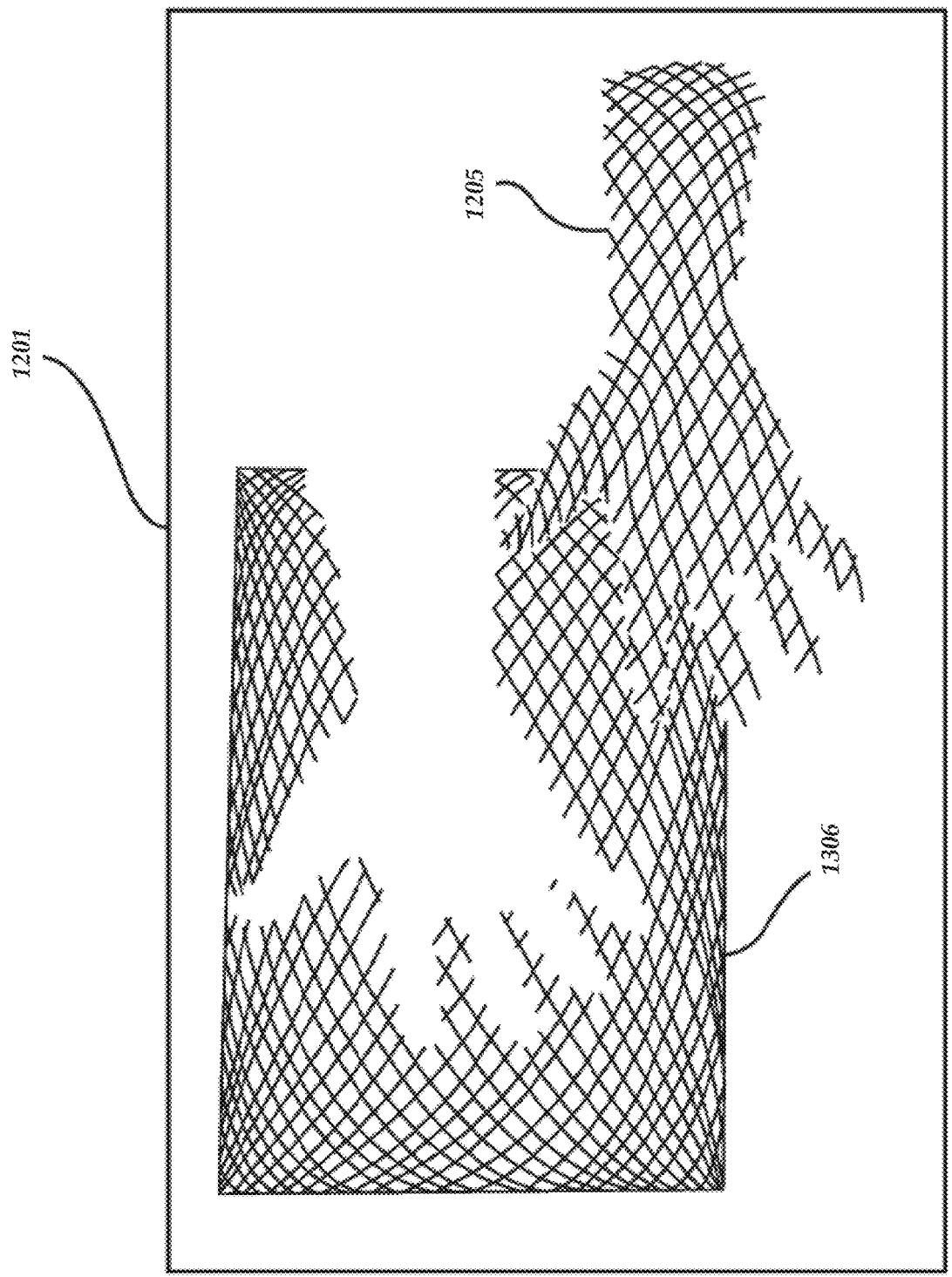
FIG. 12 illustrates a representation of how the shape or position of trajectories may correspond to the shapes or positions of subjects that may be scanned in scenes in accordance with one or more of the various embodiments.

FIG. 12 illustrates a representation of how the shape or position of trajectories may correspond to the shapes or positions of subjects that may be scanned in scenes in accordance with one or more of the various embodiments. It this example, scene 1201 may be scanned by beam generators, such as, laser beams from scanning systems, beam generators, signal generators, robots, endoscopes, or otherwise. Accordingly, in some embodiments, a pattern of paths may be scanned across surface 1206. Also, in this example, shape 1205 may be distinguished from the background scene based on deformations or translations in the trajectories (e.g., paths) that result from the shape or position of the shape 1205 as compared to the background or other shapes that may be included in scene.

Also, it will be understood that each block (or step) in each flowchart illustration, and combinations of blocks in each flowchart illustration, may be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as may arise in a multi-processor computer system. In addition, one or more blocks or combinations of blocks in each flowchart illustration may also be performed concurrently with other blocks or combinations of blocks, or even in a different sequence than illustrated without departing from the scope or spirit of the innovations.

Accordingly, each block (or step) in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, may be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the innovations.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Further, in some cases, for brevity or clarity, signal generators may be referred to above as lasers, scanning lasers, beams, or the like. Accordingly, one of ordinary skill in the art will appreciate that such specific references may be considered to be signal generators. Likewise, in some cases, sensors, event sensors, image sensors, or the like, may be referred to as cameras, event cameras, image cameras, frame capture cameras, or the like. Accordingly, one of ordinary skill in the art will appreciate that such specific references may be considered to be sensors, event sensors, image sensors, or the like.

What is claimed as new and desired to be protected by Letters Patent of the United States is:

1. A method for sensing objects using one or more processors to execute instructions that are configured to cause actions, comprising:
   scanning a plurality of paths across one or more objects in a scene with one or more beams;
   capturing one or more images of the scene with one or more frame cameras, wherein the one or more images include one or more traces that correspond to the plurality of paths and the one or more objects;
   generating a plurality of events based on detection, by one or more event cameras, of one or more beam reflections that correspond to the one or more objects;
   determining a plurality of trajectories based on the plurality of paths and the plurality of events, wherein each trajectory is a parametric representation of a one-dimensional curve segment in a three-dimensional space;
   determining a distribution of signal intensity associated with one or more of the plurality of trajectories based on an intensity of energy associated with the one or more traces in the one or more images;
   determining one or more centroids for the one or more trajectories based on the distribution of the intensity of energy, a resolution of the one or more frame cameras, and one or more timestamps associated with the one or more events; and
   generating one or more enhanced trajectories based on the one or more centroids, wherein the one or more enhanced trajectories are provided to a modeling engine that executes one or more actions based on the one or more enhanced trajectories and the one or more objects.

2. The method of claim 1, wherein determining the one or more centroids, further comprises:
   determining a sequence of one or more spots in the one or more images that comprise the one or more traces, wherein a diameter of the one or more spots is a width of the one or more associated traces on the one or more frame cameras, and wherein the diameter of the one or more spots exceeds a pixel size of the one or more frame cameras;
   determining one or more pixels associated with the one or more spots based on one or more intensity values associated with the one or more traces, wherein the one or more pixels are associated with an intensity value that exceeds a noise value of background energy; and
   determining the one or more centroids based on a gradient of the intensity value of the one or more pixels.

3. The method of claim 1, further comprising:
   determining a sequence of one or more spots in the one or more images that correspond to the one or more traces;
   determining one or more pixels of the one or more frame cameras based on the one or more spots;
   determining a portion of the one or more timestamps associated with the one or more spots based on the one or more events; and
   determining a position of each of the one or more spots based on the one or more pixels and the portion of the one or more timestamps.

4. The method of claim 1, further comprising:
   determining a time window of capture for an image based on a start time and an end time of capture for the image;
   comparing the time window for the image with the one or more timestamps that correspond to the plurality of events; and
   associating a portion of the plurality of events with the image based on the comparison, wherein each associated event has a timestamp that is within the time window associated with the image.

5. The method of claim 1, further comprising:
   modulating one or more of a frequency or an intensity of the one or more beams;
   determining one or more spots in the one or more images based on the one or more modulated beams, wherein a position of the one or more spots follows the one or more paths; and
   matching the one or more trajectories with the one or more beams based on the one or more spots and the plurality of events, wherein the plurality of events correspond to the one or more spots.

6. The method of claim 1, further comprising:
   modulating one or more of a frequency or an intensity of the one or more beams, wherein the modulation is periodically changed during the scanning of the plurality of paths; and
   determining one or more spots in the one or more images based on the one or more modulated beams, wherein a portion of the one or more spots are one or more of larger than one or more other portions of the spots or spaced apart different distances along the one or more paths; and
   identifying one or more features of the one or more objects based on the portion of the one or more spots.

7. The method of claim 1, further comprising:
   determining a position in the scene associated with one or more events based on a position of one or more pixels in the event camera sensor and the one or more timestamps associated with the one or more events;
   matching the position in the scene to a portion of the one or more traces based on the one or more trajectories; and
   determining a portion of the one or more frame cameras that have a field of view that includes the position in the scene.

8. A system for sensing objects:
   a network computer, comprising:
   a memory that stores at least instructions; and
   one or more processors that are configured to execute instructions, wherein the instructions perform actions, including:
      scanning a plurality of paths across one or more objects in a scene with one or more beams;
      capturing one or more images of the scene with one or more frame cameras, wherein the one or more images include one or more traces that correspond to the plurality of paths and the one or more objects;
      generating a plurality of events based on detection, by one or more event cameras, of one or more beam reflections that correspond to the one or more objects;
      determining a plurality of trajectories based on the plurality of paths and the plurality of events, wherein each trajectory is a parametric representation of a one-dimensional curve segment in a three-dimensional space;
      determining a distribution of signal intensity associated with one or more of the plurality of trajectories based on an intensity of energy associated with the one or more traces in the one or more images;
      determining one or more centroids for the one or more trajectories based on the distribution of the intensity of energy, a resolution of the one or more frame cameras, and one or more timestamps associated with the one or more events; and
      generating one or more enhanced trajectories based on the one or more centroids, wherein the one or more enhanced trajectories are provided to a modeling engine that executes one or more actions based on the one or more enhanced trajectories and the one or more objects; and
   one or more client computers, comprising:
      a memory that stores at least instructions; and
      one or more processors configured to execute instructions, wherein the instructions perform actions, including, providing the one or more beams to scan the scene.

9. The system of claim 8, wherein determining the one or more centroids, further comprises:
   determining a sequence of one or more spots in the one or more images that comprise the one or more traces, wherein a diameter of the one or more spots is a width of the one or more associated traces on the one or more frame cameras, and wherein the diameter of the one or more spots exceeds a pixel size of the one or more frame cameras;
   determining one or more pixels associated with the one or more spots based on one or more intensity values associated with the one or more traces, wherein the one or more pixels are associated with an intensity value that exceeds a noise value of background energy; and
   determining the one or more centroids based on a gradient of the intensity value of the one or more pixels.

10. The system of claim 8, wherein the one or more processors of the network computer are configured to execute instructions, wherein the instructions perform actions further comprising:
- determining a sequence of one or more spots in the one or more images that correspond to the one or more traces;
- determining one or more pixels of the one or more frame cameras based on the one or more spots;
- determining a portion of the one or more timestamps associated with the one or more spots based on the one or more events; and
- determining a position of each of the one or more spots based on the one or more pixels and the portion of the one or more timestamps.

11. The system of claim 8, wherein the one or more processors of the network computer are configured to execute instructions, wherein the instructions perform actions further comprising:
- determining a time window of capture for an image based on a start time and an end time of capture for the image;
- comparing the time window for the image with the one or more timestamps that correspond to the plurality of events; and
- associating a portion of the plurality of events with the image based on the comparison, wherein each associated event has a timestamp that is within the time window associated with the image.

12. The system of claim 8, wherein the one or more processors of the network computer are configured to execute instructions, wherein the instructions perform actions further comprising:
- modulating one or more of a frequency or an intensity of the one or more beams;
- determining one or more spots in the one or more images based on the one or more modulated beams, wherein a position of the one or more spots follows the one or more paths; and
- matching the one or more trajectories with the one or more beams based on the one or more spots and the plurality of events, wherein the plurality of events correspond to the one or more spots.

13. The system of claim 8, wherein the one or more processors of the network computer are configured to execute instructions, wherein the instructions perform actions further comprising:
- modulating one or more of a frequency or an intensity of the one or more beams, wherein the modulation is periodically changed during the scanning of the plurality of paths; and
- determining one or more spots in the one or more images based on the one or more modulated beams, wherein a portion of the one or more spots are one or more of larger than one or more other portions of the spots or spaced apart different distances along the one or more paths; and identifying one or more features of the one or more objects based on the portion of the one or more spots.

14. The system of claim 8, wherein the one or more processors of the network computer are configured to execute instructions, wherein the instructions perform actions further comprising:
- determining a position in the scene associated with one or more events based on a position of one or more pixels in the event camera sensor and the one or more timestamps associated with the one or more events;
- matching the position in the scene to a portion of the one or more traces based on the one or more trajectories; and
- determining a portion of the one or more frame cameras that have a field of view that includes the position in the scene.

15. A network computer for sensing objects, comprising:
a memory that stores at least instructions; and
one or more processors configured to execute instructions, wherein the instructions perform actions, including:
- scanning a plurality of paths across one or more objects in a scene with one or more beams;
- capturing one or more images of the scene with one or more frame cameras, wherein the one or more images include one or more traces that correspond to the plurality of paths and the one or more objects;
- generating a plurality of events based on detection, by one or more event cameras, of one or more beam reflections that correspond to the one or more objects;
- determining a plurality of trajectories based on the plurality of paths and the plurality of events, wherein each trajectory is a parametric representation of a one-dimensional curve segment in a three-dimensional space;
- determining a distribution of signal intensity associated with one or more of the plurality of trajectories based on an intensity of energy associated with the one or more traces in the one or more images;
- determining one or more centroids for the one or more trajectories based on the distribution of the intensity of energy, a resolution of the one or more frame cameras, and one or more timestamps associated with the one or more events; and
- generating one or more enhanced trajectories based on the one or more centroids, wherein the one or more enhanced trajectories are provided to a modeling engine that executes one or more actions based on the one or more enhanced trajectories and the one or more objects.

16. The network computer of claim 15, wherein determining the one or more centroids, further comprises:
- determining a sequence of one or more spots in the one or more images that comprise the one or more traces, wherein a diameter of the one or more spots is a width of the one or more associated traces on the one or more frame cameras, and wherein the diameter of the one or more spots exceeds a pixel size of the one or more frame cameras;
- determining one or more pixels associated with the one or more spots based on one or more intensity values associated with the one or more traces, wherein the one or more pixels are associated with an intensity value that exceeds a noise value of background energy; and
- determining the one or more centroids based on a gradient of the intensity value of the one or more pixels.

17. The network computer of claim 15, wherein the one or more processors are configured to execute instructions, wherein the instructions perform actions further comprising:
- determining a sequence of one or more spots in the one or more images that correspond to the one or more traces;
- determining one or more pixels of the one or more frame cameras based on the one or more spots;
- determining a portion of the one or more timestamps associated with the one or more spots based on the one or more events; and determining a position of each of the one or more spots based on the one or more pixels and the portion of the one or more timestamps.

18. The network computer of claim 15, wherein the one or more processors are configured to execute instructions, wherein the instructions perform actions further comprising:
    determining a time window of capture for an image based on a start time and an end time of capture for the image;
    comparing the time window for the image with the one or more timestamps that correspond to the plurality of events; and
    associating a portion of the plurality of events with the image based on the comparison, wherein each associated event has a timestamp that is within the time window associated with the image.

19. The network computer of claim 15, wherein the one or more processors are configured to execute instructions, wherein the instructions perform actions further comprising:
    modulating one or more of a frequency or an intensity of the one or more beams;
    determining one or more spots in the one or more images based on the one or more modulated beams, wherein a position of the one or more spots follows the one or more paths; and
    matching the one or more trajectories with the one or more beams based on the one or more spots and the plurality of events, wherein the plurality of events correspond to the one or more spots.

20. The network computer of claim 15, wherein the one or more processors are configured to execute instructions, wherein the instructions perform actions further comprising:
    modulating one or more of a frequency or an intensity of the one or more beams, wherein the modulation is periodically changed during the scanning of the plurality of paths; and
        determining one or more spots in the one or more images based on the one or more modulated beams, wherein a portion of the one or more spots are one or more of larger than one or more other portions of the spots or spaced apart different distances along the one or more paths; and identifying one or more features of the one or more objects based on the portion of the one or more spots.

21. The network computer of claim 15, wherein the one or more processors are configured to execute instructions, wherein the instructions perform actions further comprising:
    determining a position in the scene associated with one or more events based on a position of one or more pixels in the event camera sensor and the one or more timestamps associated with the one or more events;
    matching the position in the scene to a portion of the one or more traces based on the one or more trajectories; and
    determining a portion of the one or more frame cameras that have a field of view that includes the position in the scene.

22. A processor readable non-transitory storage media that includes instructions for sensing objects, wherein execution of the instructions by one or more processors on one or more network computers performs actions, comprising:
    scanning a plurality of paths across one or more objects in a scene with one or more beams;
    capturing one or more images of the scene with one or more frame cameras, wherein the one or more images include one or more traces that correspond to the plurality of paths and the one or more objects;
    generating a plurality of events based on detection, by one or more event cameras, of one or more beam reflections that correspond to the one or more objects;
    determining a plurality of trajectories based on the plurality of paths and the plurality of events, wherein each trajectory is a parametric representation of a one-dimensional curve segment in a three-dimensional space;
    determining a distribution of signal intensity associated with one or more of the plurality of trajectories based on an intensity of energy associated with the one or more traces in the one or more images;
    determining one or more centroids for the one or more trajectories based on the distribution of the intensity of energy, a resolution of the one or more frame cameras, and one or more timestamps associated with the one or more events; and
    generating one or more enhanced trajectories based on the one or more centroids, wherein the one or more enhanced trajectories are provided to a modeling engine that executes one or more actions based on the one or more enhanced trajectories and the one or more objects.

23. The media of claim 22, wherein determining the one or more centroids, further comprises:
    determining a sequence of one or more spots in the one or more images that comprise the one or more traces, wherein a diameter of the one or more spots is a width of the one or more associated traces on the one or more frame cameras, and wherein the diameter of the one or more spots exceeds a pixel size of the one or more frame cameras;
    determining one or more pixels associated with the one or more spots based on one or more intensity values associated with the one or more traces, wherein the one or more pixels are associated with an intensity value that exceeds a noise value of background energy; and
    determining the one or more centroids based on a gradient of the intensity value of the one or more pixels.

24. The media of claim 22, further comprising:
    determining a sequence of one or more spots in the one or more images that correspond to the one or more traces;
    determining one or more pixels of the one or more frame cameras based on the one or more spots;
    determining a portion of the one or more timestamps associated with the one or more spots based on the one or more events; and
    determining a position of each of the one or more spots based on the one or more pixels and the portion of the one or more timestamps.

25. The media of claim 22, further comprising:
    determining a time window of capture for an image based on a start time and an end time of capture for the image;
    comparing the time window for the image with the one or more timestamps that correspond to the plurality of events; and
    associating a portion of the plurality of events with the image based on the comparison, wherein each associated event has a timestamp that is within the time window associated with the image.

26. The media of claim 22, further comprising:
    modulating one or more of a frequency or an intensity of the one or more beams;
    determining one or more spots in the one or more images based on the one or more modulated beams, wherein a position of the one or more spots follows the one or more paths; and matching the one or more trajectories with the one or more beams based on the one or more spots and the plurality of events, wherein the plurality of events correspond to the one or more spots.

27. The media of claim 22, further comprising:

modulating one or more of a frequency or an intensity of the one or more beams, wherein the modulation is periodically changed during the scanning of the plurality of paths; and determining one or more spots in the one or more images based on the one or more modulated beams, wherein a portion of the one or more spots are one or more of larger than one or more other portions of the spots or spaced apart different distances along the one or more paths; and identifying one or more features of the one or more objects based on the portion of the one or more spots.

28. The media of claim 22, further comprising:

determining a position in the scene associated with one or more events based on a position of one or more pixels in the event camera sensor and the one or more timestamps associated with the one or more events;

matching the position in the scene to a portion of the one or more traces based on the one or more trajectories; and determining a portion of the one or more frame cameras that have a field of view that includes the position in the scene.

* * * * *